United States Patent
Garvey et al.

(10) Patent No.: US 9,614,428 B2
(45) Date of Patent: Apr. 4, 2017

(54) SWITCHING REGULATOR CIRCUIT ALLOWING A LOWER INPUT VOLTAGE

(71) Applicant: Allegro MicroSystems, LLC, Worcester, MA (US)

(72) Inventors: Richard Garvey, Amherst, NH (US); Bassem Alnahas, Manchester, NH (US); Vijay Mangtani, Nashua, NH (US)

(73) Assignee: Allegro MicroSystems, LLC, Worcester, MA (US)

( * ) Notice: Subject to any disclaimer, the term of this patent is extended or adjusted under 35 U.S.C. 154(b) by 41 days.

(21) Appl. No.: 14/683,617

(22) Filed: Apr. 10, 2015

(65) Prior Publication Data

US 2015/0303807 A1   Oct. 22, 2015

Related U.S. Application Data

(60) Provisional application No. 61/980,178, filed on Apr. 16, 2014.

(51) Int. Cl.
*H02M 1/08* (2006.01)
*H02M 3/07* (2006.01)
*H02M 3/158* (2006.01)
*H02M 1/00* (2006.01)

(52) U.S. Cl.
CPC .............. *H02M 1/08* (2013.01); *H02M 3/07* (2013.01); *H02M 3/1582* (2013.01); *H02M 2001/0006* (2013.01); *H02M 2001/007* (2013.01); *H02M 2001/0045* (2013.01)

(58) Field of Classification Search
CPC .............. H02M 3/156; H02M 3/1588; H02M 2001/0022
USPC .............. 323/222, 224, 259, 263, 282–284; 363/15, 16, 21.12, 59, 60, 65, 80, 81, 89, 363/97
See application file for complete search history.

(56) References Cited

U.S. PATENT DOCUMENTS

| | | | | |
|---|---|---|---|---|
| 4,974,141 A | * | 11/1990 | Severinsky | H02M 1/4208 323/224 |
| 5,528,125 A | * | 6/1996 | Marshall | H02M 3/1582 323/222 |
| 5,602,463 A | * | 2/1997 | Bendall | G05F 1/62 323/266 |
| 5,831,418 A | * | 11/1998 | Kitagawa | H02M 3/1582 323/222 |
| 6,166,527 A | * | 12/2000 | Dwelley | H02M 3/1582 323/222 |
| 6,275,016 B1 | * | 8/2001 | Ivanov | H02M 3/158 323/224 |
| 6,982,527 B2 | | 1/2006 | Lee et al. | |
| 8,339,049 B2 | | 12/2012 | Kang et al. | |
| 8,456,105 B2 | | 6/2013 | Wang et al. | |
| 8,519,630 B2 | | 8/2013 | Wang et al. | |
| 8,664,930 B2 | | 3/2014 | Kang et al. | |
| 8,742,682 B1 | | 6/2014 | Wang et al. | |

(Continued)

*Primary Examiner* — Rajnikant Patel
(74) *Attorney, Agent, or Firm* — Daly, Crowley, Mofford & Durkee, LLP

(57) ABSTRACT

A buck-boost switching regulator has an output voltage boost circuit to provide a boosted output voltage. The boosted voltage is used to generate higher voltage control signals to gates of NMOS switches, resulting in an ability to operate at lower input voltages.

20 Claims, 12 Drawing Sheets

(56) References Cited

U.S. PATENT DOCUMENTS

| | | | |
|---|---|---|---|
| 8,791,672 B2 * | 7/2014 | Klein | H02M 3/1582 |
| | | | 323/222 |
| 8,901,835 B2 | 12/2014 | Kang et al. | |
| 8,937,433 B1 | 1/2015 | Wang et al. | |
| 9,048,729 B2 * | 6/2015 | Kumagai | H02M 3/1582 |

* cited by examiner

SWITCHING REGULATOR CIRCUIT ALLOWING A LOWER INPUT VOLTAGE

CROSS REFERENCE TO RELATED APPLICATIONS

This application claims the benefit under 35 U.S.C. §119 (e) of U.S. Provisional Application No. 61/980,178, filed Apr. 16, 2014, which application is incorporated herein by reference in its entirety.

STATEMENT REGARDING FEDERALLY SPONSORED RESEARCH

Not Applicable.

FIELD OF THE INVENTION

This invention relates generally to switching regulator electronic circuits, and, more particularly, to a switching regulator circuit that allows a lower input voltage.

BACKGROUND

As is known, switching regulators provide a regulated output voltage to a load. The output voltage is regulated to be a substantially constant voltage irrespective of variations in the load and variations in the input voltage.

Conventional switching regulators have at least three configurations, including, but not limited to, a buck configuration, a boost configuration, and a buck-boost configuration. A conventional buck switching regulator provides a regulated output voltage in response to an input voltage that is higher than the regulated output voltage. A conventional boost switching regulator provides a regulated output voltage in response to an input voltage that is lower than the regulated output voltage. A conventional buck-boost switching regulator provides a regulated output voltage in response when input voltage that is higher, lower, and equal to the regulated output voltage.

Depending on configuration, a conventional switching regulator can have one or more electronic switches, an inductor coupled to the one or more electronic switches, and a capacitor coupled to an output node at which a regulated output voltage is generated. A conventional switching regulator also has a control circuit coupled in a feedback arrangement. Wherein the control circuit is coupled to receive the regulated output voltage, and, depending upon the sensed regulated output voltage, the control circuit is configured to generate one or more pulse width modulated (PWM) control signals having respective duty cycles proportional to a ratio between an input voltage to the switching regulator and the sensed regulated output voltage. The one or more control signals are used to turn on and of the one or more electronic switches, respectively.

It is known that n-channel field effect transistors (FETs) tend to have higher efficiency (i.e., lower drain-source resistance) than p-channel. FETs with the same integrated circuit area. Thus, conventional switching regulators tend to use n-channel FETs, and NMOS FETs in particular, as the one or more electronic switches, as opposed to p-channel FETs or PMOS FETs.

In order to switch to an on condition, an NMOS FET must have a gate-source voltage above a specified number of volts, for example, five volts. It will be apparent from discussion below that, for low input voltages, for example, three volts, conventional buck-boost switching regulators are unable to achieve a high enough gate-source voltage to turn on at least some of the one or more electronic switches, and thus, they are unable to regulate the output voltage for low input voltages.

It would be desirable to provide a buck-boost switching regulator that can operate at lower input voltages.

SUMMARY

The present invention provides a buck-boost switching regulator that can operate at lower input voltages.

In accordance with an example useful for understanding an aspect of the present invention, a switching voltage regulator for receiving an input voltage and for generating a regulated output voltage is capable of a buck mode of operation, a boost mode of operation, and a buck-boost mode of operation. The switching regulator can include an inductor having an input terminal and an output terminal. The input terminal of the inductor is coupled to an input voltage node configured to receive the input voltage. The switching regulator can also include a first electronic switch having a first current passing terminal, a second current passing terminal, and a control terminal. The first current passing terminal is coupled to the input voltage node and the second terminal coupled to the input terminal of the inductor. The switching regulator can also include an output voltage boost circuit coupled to receive the regulated output voltage and configured to generate a boosted output voltage higher than the regulated output voltage. The switching regulator can also include a first active electronic component powered from a voltage approximately equal to the boosted output voltage when the switching regulator is in the boost mode of operation. The first active electronic component has an output terminal at which the first control signal is generated.

In accordance with another example useful for understanding another aspect of the present invention, a method is used in a switching regulator. The regulator is capable of a buck mode of operation, a boost mode of operation, and a buck-boost mode of operation. The method can include one or more of the following: receiving an input voltage; communicating a control signal to an electronic switch; generating a regulated output voltage in accordance with the communicating; generating a boosted output voltage higher than the regulated output voltage; and generating the control signal with an active electronic component powered by a voltage approximately equal to the boosted output voltage when the switching regulator is in the boost mode of operation.

BRIEF DESCRIPTION OF THE DRAWINGS

The foregoing features of the invention, as well as the invention itself may be more fully understood from the following detailed description of the drawings, in which.

DETAILED DESCRIPTION

Figure 1:
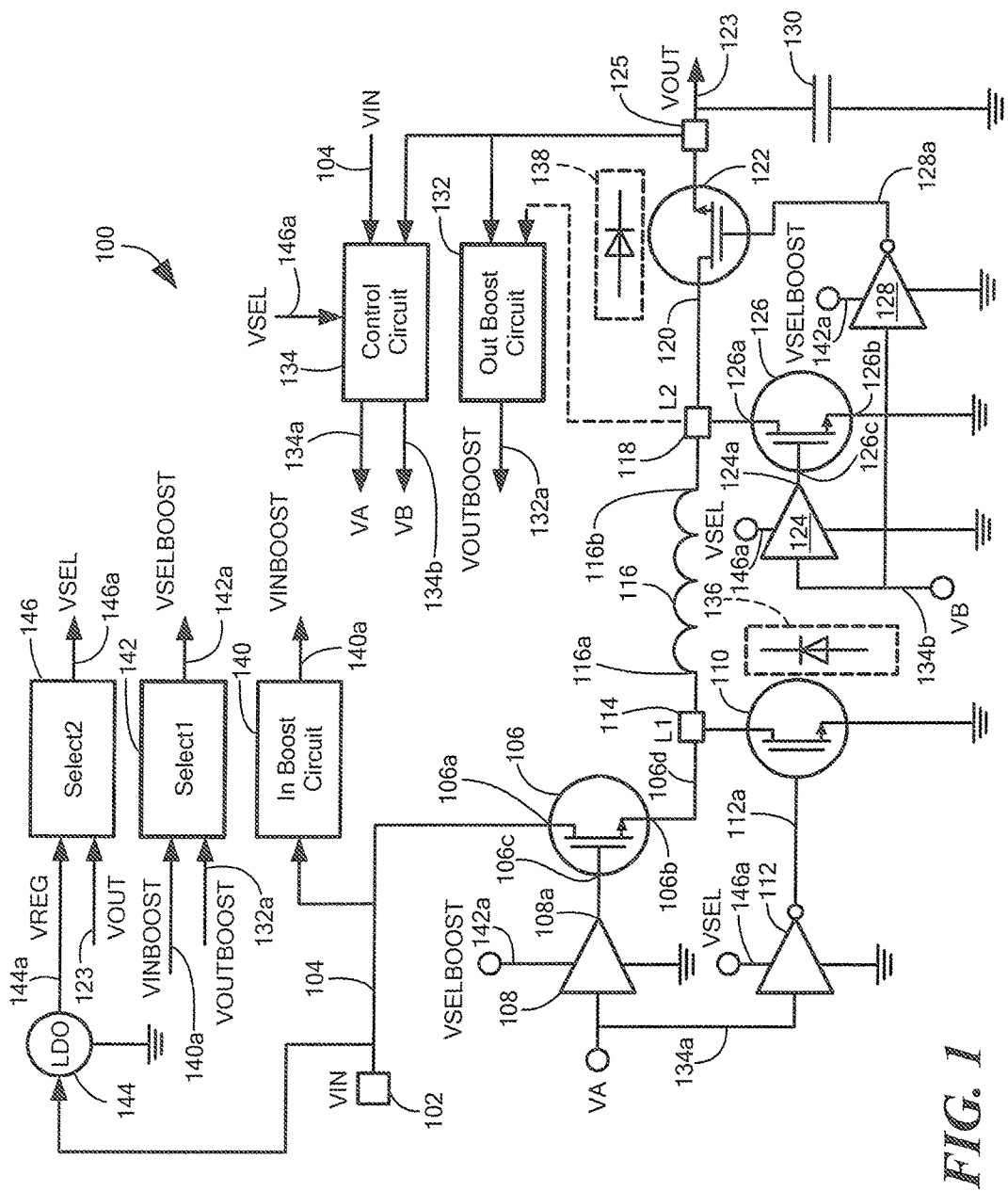
FIG. 1 is a block diagram showing an example of a buck-boost switching regulator that has an output voltage boost circuit, an input voltage boost circuit, first and second voltage selection circuits, and also a control circuit to generate control signals.

As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals.

In some embodiments, the "processor" can be embodied in an application specific integrated circuit (ASIC), which can be an analog ASIC or a digital ASIC. In some embodiments, the "processor" can be embodied in a microprocessor with associated program memory. In some embodiments, the "processor" can be embodied in a discrete electronic circuit, which can be an analog or digital.

As used herein, the term "module" is used to describe a "processor."

A processor can contain internal processors or internal modules that perform portions of the function, operation, or sequence of operations of the processor. Similarly, a module can contain internal processors or internal modules that perform portions of the function, operation, or sequence of operations of the module.

Control circuits described herein can be processors.

While electronic circuit shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures, but should be understood.

As used herein, the term "predetermined," when referring to a value or signal, is used to refer to a value or signal that is set, or fixed, in the factory at the time of manufacture. As used herein, the term "determined," when referring to a value or signal, is used to refer to a value or signal that is identified by a circuit during operation, after manufacture.

As used herein, the term "current passing terminal" is used to describe a terminal of an electronic component into which current can flow or out of which current can flow. The electronic component can be an active electronic component or a passive electronic component.

As used herein, the term "active electronic component" is used to describe and electronic component that has at least one p-n junction. A transistor, a diode, and a logic gate are examples of active electronic components. In contrast, as used herein, the term "passive electronic component" as used to describe an electronic component that does not have at least one p-n junction. A capacitor and a resistor are examples of passive electronic components.

Reference is made herein to electronic circuits integrated onto a common substrate, except for components otherwise indicated. The common substrate can be within an integrated circuit package having a plurality of integrated circuit pins. However, in some other embodiments, all of the electronic components shown and described below are separate discrete components and the integrated circuit pins shown and described below do not apply.

Switching regulators described below can be used in a variety of applications. One such application is an automotive application. For automotive applications, the battery used in an automobile can vary over a wide range of volts. While nominally at twelve volts, when activating a starter motor used to start an internal combustion engine, the automobile battery voltage can drop as low as three volts. Also, when deactivating a starter motor, the battery voltage, due to inductance in the starter motor, can temporarily jump tens or hundreds of volts above twelve volts.

Some newer automobiles use the starter motor repeatedly during normal operation of the automobile, for example, automatically stopping the internal combustion engine when a driver stops at a stoplight, and automatically restarting internal combustion engine when the driver steps on the accelerator pedal. Particularly under these conditions, is highly desirable that all of the electronic equipment (e.g., an engine control processor) in the automobile maintain proper operation throughout the stopping and starting of the internal combustion engine. Thus, it is highly desirable that regulated voltages used in automobile electronics maintain the regulated voltages over a wide range of battery voltages.

In accordance with automobile applications, examples below use three volts and twelve volts (or twenty volts) as input voltages and five volts as a regulated output voltage. However, the same techniques apply to other ranges of input voltages and also to other output voltages.

Referring to FIG. 1, an example of a buck-boost switching regulator 100 is configured to receive an input voltage 104 at an integrated circuit pin 102. The integrated circuit pin 102 is coupled to a first current passing terminal 106a (for example, a drain terminal) of a first electronic switch 106 (for example, an n-channel (N) metal-oxide-silicon (MOS) field effect transistor (FET).

A second current passing terminal 106b (for example, a source terminal) of the first electronic switch 106 is coupled to another integrated circuit pin 114. The integrated circuit pin 114 is coupled to a first end 116a of an inductor 116. A second end 116b of the inductor 116 is coupled to an integrated circuit pin 118.

The integrated circuit pin 118 is coupled to a first current passing terminal 126a (for example, a drain terminal) of a second electronic switch 126 (for example, an NMOS FET). A second current passing terminal 126b (for example, a source terminal) of the second electronic switch 126 is coupled to a reference voltage source (for example, a ground).

A third electronic switch 110 has first and second current passing terminals coupled to the integrated circuit pin 114 and the reference voltage source, respectively.

A fourth electronic switch 122 has a first current passing terminal coupled to the integrated circuit pin 118 and a second current passing terminal coupled to an integrated circuit pin 125 at which an output voltage (VOUT) 123 is generated.

The buck-boost switching regulator 100 can include first, second, third, and fourth active electronic components, for example, first, second, third, and fourth logic buffers 108, 124, 112, 128, respectively, for generating buffered control signals (e.g., 108a, 124a) coupled to respective control terminals (e.g., 106c, 126c) of the first, second, third, and fourth electronic switches 106, 126, 110, 122.

For reasons that are apparent from discussion below, it is desirable that output signals generated by the first, second, third, and fourth logic buffers 108, 124, 112, 128, respectively, are able to achieve high state voltages at or near to supply voltages that power the first, second, third, and fourth logic buffers 108, 124, 112, 128, respectively.

While logic buffers 108, 124, 112, 128, are shown, many other types of active electronic components can be used instead, for example, logic gates or transistor circuits.

The buck-boost switching regulator 100 can include a capacitor 130 coupled at one end to the output voltage (VOUT) 123 and coupled at the other end to the reference voltage source, for example, ground.

The buck-boost switching regulator 100 can include a control circuit 134 coupled to receive the output voltage (VOUT) 123 and configured to generate one or more control signals, here two control signals 134a, 134b in response to the output voltage (VOUT) 123. The control signal 134a can be coupled to input terminals of the first and third logic buffers 108, 112, respectively, to control the first and third electronic switches 106, 110, respectively. The control signal 134b can be coupled to input terminals of the second and fourth logic buffers 124, 128, respectively, to control the second and fourth electronic switches 126, 122, respectively.

In some embodiments, the control circuit 134 can also be coupled to receive the input voltage (VIN) 104. Thus, depending upon a value of the output voltage (VOUT) 123 relative to the input voltage (VIN) 104, the control circuit 134 can generate control signals 134a, 134b to be like those of graphs 300, 320, or 340 in FIG. 3 below, accordingly.

In some embodiments, the control circuit 134 can be of a type described in U.S. patent application Ser. No. 14/615,050, filed Feb. 5, 2015, which is entitled "Buck-Boost Converter Control Circuits And Techniques," and which is incorporated herein in its entirety. Some aspects of an example of the control circuit 134 are described below in conjunction with FIGS. 13 and 14.

In other embodiments, the control circuit 134 can e of a type described, for example, in U.S. Pat. No. 6,984,967, issued Jan. 10, 2006, which is assigned to the assignee of the present invention, and which is incorporated by reference herein in its entirety.

The buck-boost switching regulator 100 can include an output voltage boost circuit 132 coupled to receive the output voltage (VOUT) 123 and configured to generate a boosted output voltage (VOUTBOOST) 132a that has a voltage higher than the output voltage (VOUT) 123. Examples of output voltage boost circuits are described below in conjunction with FIGS. 4, 6, and 8-12.

The buck-boost switching regulator 100 can also include an input voltage boost circuit 140 coupled to receive the input voltage 104 and configured to generate a boosted input voltage (VINBOOST) 140a that is higher than the input voltage (VIN) 104, for example, double, but only over a certain range of input voltages (for example, three volts to six volts). Outside of the certain range of input voltages, the boosted input voltage 140a approximately tracks the input voltage 104. An example of an input voltage boost circuit is described below in conjunction with FIG. 7.

The buck-boost-switching regulator 100 can also include a voltage regulator, for example, a low dropout (LDO) voltage linear regulator 144 coupled to receive the input voltage (VIN) 104 and configured to generate a regulated output voltage (VREG) 144a. In some embodiments, the regulated output voltage is about five volts.

The buck-boost-switching regulator 100 can also include a first selection circuit 142 coupled to receive the boosted output voltage 132a, coupled to receive the boosted input voltage 140a, and configured to select, as a selected boosted voltage (VSELBOOST) 142a, a highest one of the boosted output voltage 132a or the boosted input voltage 140a.

The buck-boost-switching regulator 100 can also include a second selection circuit 146 coupled to receive the regulated voltage 144a, coupled to receive the output voltage 123, and configured to select, as a selected voltage (VSEL) 146a, a highest selected one of the regulated voltage (VREG) 144a or the output voltage (VOUT) 123.

For clarity, Table 1 below lists examples of voltages for the buck, buck-boost, and boost modes of operation. In Table 1, various diode voltage drops that are apparent from discussion below are not considered.

TABLE 1

| | VIN 104 | VOUT 123 | VREG 144a | VOUTBOOST 132a | VINBOOST 140a | VSELBOOST 142a | VSEL 146a |
|---|---|---|---|---|---|---|---|
| Buck | 20.0 | 5.0 | 5.0 | 5.0 (output voltage boost circuit 132 not boosting) | 26.0 (assuming VREF = +6.0 V, see FIG. 7) | 26.0 | 5.0 |
| Buck | 12.0 | 5.0 | 5.0 | 5.0 (output voltage boost circuit 132 not boosting) | 18.0 (assuming VREF = +6.0 V, see FIG. 7) | 18.0 | 5.0 |
| Buck-Boost | 5.0 | 5.0 | <5.0 | 10.0 (output voltage boost circuit 132 | 10.0 (input voltage boost circuit | 10.0 | 5.0 |

TABLE 1-continued

| | VIN 104 | VOUT 123 | VREG 144a | VOUTBOOST 132a | VINBOOST 140a | VSELBOOST 142a | VSEL 146a |
|---|---|---|---|---|---|---|---|
| | | | | doubling) | 140 doubling) | | |
| Boost | 3.0 | 5.0 | <3.0 | 10.0 (output voltage boost circuit 132 doubling | 6.0 (input voltage boost circuit 140 doubling) | 10.0 | 5.0 |

The first and fourth logic buffers 108, 128 are coupled to receive, as a power supply voltage, the selected boosted voltage (VSELBOOST) 142a. The second and third logic buffers 124, 112 are coupled to receive, as a power supply voltage, the selected voltage (VSEL) voltage 146a.

From Table 1, it would appear that the selected voltage (VSEL) 146a is not required because it is always equal to the output voltage (VOUT) 123. Thus, it would appear that the output voltage (VOUT) 123 can be used in place of the selected voltage (VSEL) 146a to power the second and third logic buffers 124, 112, respectively. However, the output voltage (VOUT) 123 is not immediately available upon power up of the buck-boost switching regulator 100, and thus, the second and third logic buffers 124, 112 obtain their power, via the selected voltage (VSEL) 146a, from the regulated voltage (VREG) 144a as the output voltage (VOUT) 123 ramps up. The selected voltage (VSEL) 146a is rapidly available upon power up. During this same time period, the selected boosted voltage (VSELBOOST) 142a is controlled by the boosted input voltage (VINBOOST) 146a, which is also rapidly available upon power up.

From Table 1, it should also be apparent that selected boosted voltage (VSELBOOST) 142a takes on the value of the boosted input voltage (VINBOOST) 140a for higher input voltages (e.g., buck mode of operation), and takes on the value of the boosted output voltage (VOUTBOOST) 132a for lower input voltages (e.g., boost mode of operation). The value of the boosted input voltage (VINBOOST) 140a for higher input voltages is required because, for the higher input voltages, the output voltage boost circuit 132 is not operating (i.e., boosting). For the lower input voltages, the input voltage boost circuit 140 is still boosting, but not necessarily generating enough volts.

The above selected boosted voltage (VSELBOOST) 142a in particular allows for proper start up and proper operation of the buck-boost switching regulator 100 over a wider range of voltages than would otherwise be possible. In particular, for low input voltages in the boost mode of operation, where the voltage at the source terminal 106b of the first electronic switch 106 is approximately equal to the output voltage (VOUT) 123 (e.g., five volts), the first electronic switch 106 would not otherwise achieve a sufficient gate-source voltage to turn on the first electronic switch 106 if the first logic buffer 106 were powered by the boosted input voltage (VINBOOST) 146a (e.g., six volts) instead of by selected boosted voltage (VSELBOOST) 142a (e.g., ten volts).

In some embodiments, the control circuit 134 is coupled to receive, as a power supply voltage, the selected voltage (VSEL) 146a. In some embodiments, the first, second, third, and fourth logic buffers 108, 124, 112, 128 are within the control circuit 134, in which case, the control circuit 134 is configured to generate four control signals coupled to the first, second, third, and fourth electronic switches 106, 126, 110, 122, respectively, each having a high state voltage in accordance with the power supply voltages coupled to the logic buffers of FIG. 1.

One or more of the logic buffers 108, 124, 112, 128 can include or be associated with voltage translation circuits (not shown) to allow proper operation when receiving the control signals 134a, 134b that may have voltage states that are not within acceptable input signal ranges for the one or more of the logic buffers 108, 124, 112, 128.

In some embodiments, the control circuit 134 is instead powered by the output voltage (VOUT) 123 (e.g., five volts).

The control circuit 134 is also coupled to receive the output voltage (VOUT) 123 and configured to use the output voltage (VOUT) 123 in a feedback arrangement to control states of the control signals 134a, 134h to result in the output voltage (VOUT) 123 being a regulated output voltage substantially invariant over a range of input voltages 104.

The first and second logic buffers 108, 124 are shown to be noninverting logic buffers. The second and fourth logic buffers 112, 128 are shown to be inverting logic buffers. Thus, signals appearing at output terminals of the first and third logic buffers 108, 112 are related by an inversion (or one hundred eighty degree phase) and signals appearing at output terminals of the second and fourth logic buffers 124, 128 are also related by an inversion.

The first and third electronic switches 106, 110 will be understood to be indicative of electronic switches used in a buck switching regulator. The second and fourth electronic switches 126, 122 will be understood to be indicative of the electronic switches used in a boost switching regulator. The first, second, third, and fourth electronic switches 108, 126, 110, 122, when used in concert, can provide the buck-boost mode of operation.

As described above, a buck switching regulator can operate in a buck mode of operation for which an input voltage (e.g., 104) is above an output voltage (e.g., (VOUT) 123). As also described above, a boost switching regulator can operate in a boost mode of operation for which an input voltage (e.g., 104) is below an output voltage (e.g., (VOUT) 123). As also described above, a buck-boost switching regulator can operate in the above-described buck mode of operation, in the above-described boost mode of operation, and in a buck-boost mode of operation for which an input voltage (e.g., 104) is equal to or approximately equal to an output voltage (e.g., (VOUT) 123).

For reasons described above, it is desirable to use NMOS electronic switches rather than PMOS electronic switches. NMOS electronic switches turn on, i.e., provide a low resistance between current passing terminals (e.g., between a drain terminal 106a and a source terminal 106b) for gate-source voltages (e.g., voltages between a gate terminal 106c and a source terminal 106b) of at least a predetermined number of volts, for example, five volts. The voltage on the gate terminal (e.g., 106*c*) must be higher than the voltage on the source terminal.

Some semiconductor processes may limit a maximum amount of gate-source voltage (e.g., seven volts) that may be applied before failure of an electronic switch. In part for this reason, the second and third electronic buffers 124, 112 are not powered by the selected boosted voltage (VSELBOOST) 142*a* or by the boosted output voltage (VOUTBOOST) 132*a*. However, for other semiconductor processes that allow higher gate-source voltages, the second and third electronic buffers 124, 112 can instead be powered by the boosted output voltage (VOUTBOOST) 132*a*.

It will become apparent from discussion below in conjunction with FIG. 3 that, when operating in the buck mode of operation, the first electronic switch 106 must turn on and off periodically in opposition to the third electronic switch 110. Furthermore, when operating in the buck-boost mode of operation, the first electronic switch 106 must turn on and off periodically in opposition to the third electronic switch 110. Still further, when operating in the boost mode of operation, the first electronic switch 106 must turn on continuously in opposition to the third electronic switch 110. Therefore, in all three modes of operation, the first electronic switch 106 must be able to turn on.

In operation, for the buck mode of operation, for which the input voltage 104 (e.g., twelve volts) is above the output voltage (e.g., five volts), and for which the first electronic switch 106 and the third electronic switch 110 periodically turn on and off in opposition, operation of the third electronic switch 110 and the inductor 116 results in a source voltage on the first electronic switch 106 of near zero volts at some times (periodically) and near the input voltage (YIN) 104 at other times. In this mode, the first and fourth logic buffers 108, 128 are powered, via the first selection circuit 142, from the boosted input voltage (VINBOOST) 140*a*.

For the buck-boost mode of operation, for which the input voltage 104 (e.g., five volts) is approximately equal to the output voltage (e.g., five volts), and for which the first electronic switch 106 and the third electronic switch 110 periodically turn on and off in opposition (but with a longer duty cycle than for the buck mode), operation of the third electronic switch 110 and the inductor 116 results in a source voltage of the first electronic switch 106 of near zero volts at some times (periodically) and near the input voltage (VIN) 104 at other times. Also, depending upon duty cycle, the source voltage of the first electronic switch 106 can at times exponentially approach the output voltage (e.g., five volts). In this mode, the boosted output voltage (VOUTBOOST) 132*a* and the boosted input voltage (VINBOOST) 140*a* are almost equal, and, via the first selection circuit 142, either could be selected to power the first and fourth logic buffers 108, 128.

For the boost mode of operation, for which the input voltage 104 (e.g., three volts) is below the output voltage (e.g., five volts), and for which the first electronic switch 106 turns on continuously (and the third electronic switch 110 turns off continuously), a source voltage of about five volts on the first electronic switch 106 would result. If the first logic buffer 108 were instead powered by the boosted input voltage (VINBOOST) 140*a*, (e.g., six volts, see Table 1), there would not be enough gate-source voltage on the first electronic switch 106 to turn on the first electronic switch 106 at all. Therefore, the electronic circuit 100 would not function properly in a boost mode of operation. Thus, the selected boosted voltage (VSELBOOST) 140*a* becomes the boosted output voltage (VOUTBOOST) 132*a* (e.g., ten volts see Table 1) to power the first logic buffer 108.

Using circuits and techniques described herein, the buck-boost switching regulator 100 boosts the output voltage (VOUT) 123 to achieve the boosted output voltage (VOUTBOOST) 132*a* (e.g., ten volts—see Table 1), which is used in the boost mode of operation as the selected boosted voltage (VBSELBOOST) 142*a* to power the first and fourth logic buffers 108, 128. Thus, a ten volt control signal 108*a* can be applied to the first electronic switch 106 to assure that the first electronic switch 106 is able to turn on in all three modes of operation.

While the third and fourth electronic switches 110, 122 are shown to be NMOS FETs, in some embodiments the third and/or fourth electronic switches 110, 122 can be replaced by diodes 136, 138. Figures below show diodes in place of the second and fourth electronic switches 110, 122 for simplicity.

In some embodiments, the NMOS FETs 106, 126, 110, 122 can be double diffused MOS (DMOS) FETs.

In some embodiments, the output voltage boost circuit 132, the control circuit 134, and the first, second, third, fourth logic buffers 108, 124, 112, 128 are integrated onto a common integrated circuit substrate. In some embodiments, the first, second, third, and fourth electronic switches 106, 126, 110, 122, respectively, are also integrated onto the common integrated circuit substrate. However, in some embodiments, the first, second, third, and fourth electronic switches 106, 126, 110, 122, respectively, are external to the common integrated circuit substrate and are coupled at integrated circuit pins as shown. In some embodiments, the capacitor 130 is external to the common integrated circuit substrate and is coupled at an integrated circuit pin as shown. In some embodiments, the inductor 116 is external to the common integrated circuit substrate and is coupled at an integrated circuit pin as shown.

It should be apparent from discussion above that the buck-boost switching regulator 100 is able to drive (i.e., turn on and off) the first and second electronic switches 106, 126 when the input voltage (YIN) 104 is relatively low and when the first and second electronic switches are NMOS FETs. An NMOS FET needs a gate drive (i.e., gate voltage) with a higher voltage than the output voltage (i.e., source voltage), which could be close to the output voltage (VOUT) 123. If instead, a boost circuit (e.g., a charge pump) were instead coupled to receive only the input voltage (VIN) 104, and that boosted voltage was instead used to power the first and second logic buffers 108, 124, then the first and second logic buffers 108, 124 would not have enough voltage to turn on the first and second electronic switches 106, 126 when the input voltage (VIN) is relatively low. In contrast, with the buck-boost switching regulator 100, the boosted voltage 132*a* from the output voltage boost circuit 132 (coupled instead to receive the output voltage (VOUT) 123) can be used, via the first selection circuit 142, to power the first and second logic buffers 108, 124 in some modes of operation.

The buck-boost switching regulator 100 can be upon the same integrated circuit substrate as other circuits that use the output voltage (VOUT) 123. For example, in some embodiments, the buck-boost switching regulator 100 is part of an integrated magnetic field sensor. For such integrated circuits, there can be additional integrated circuit pins to support other inputs and outputs.

Figure 2:
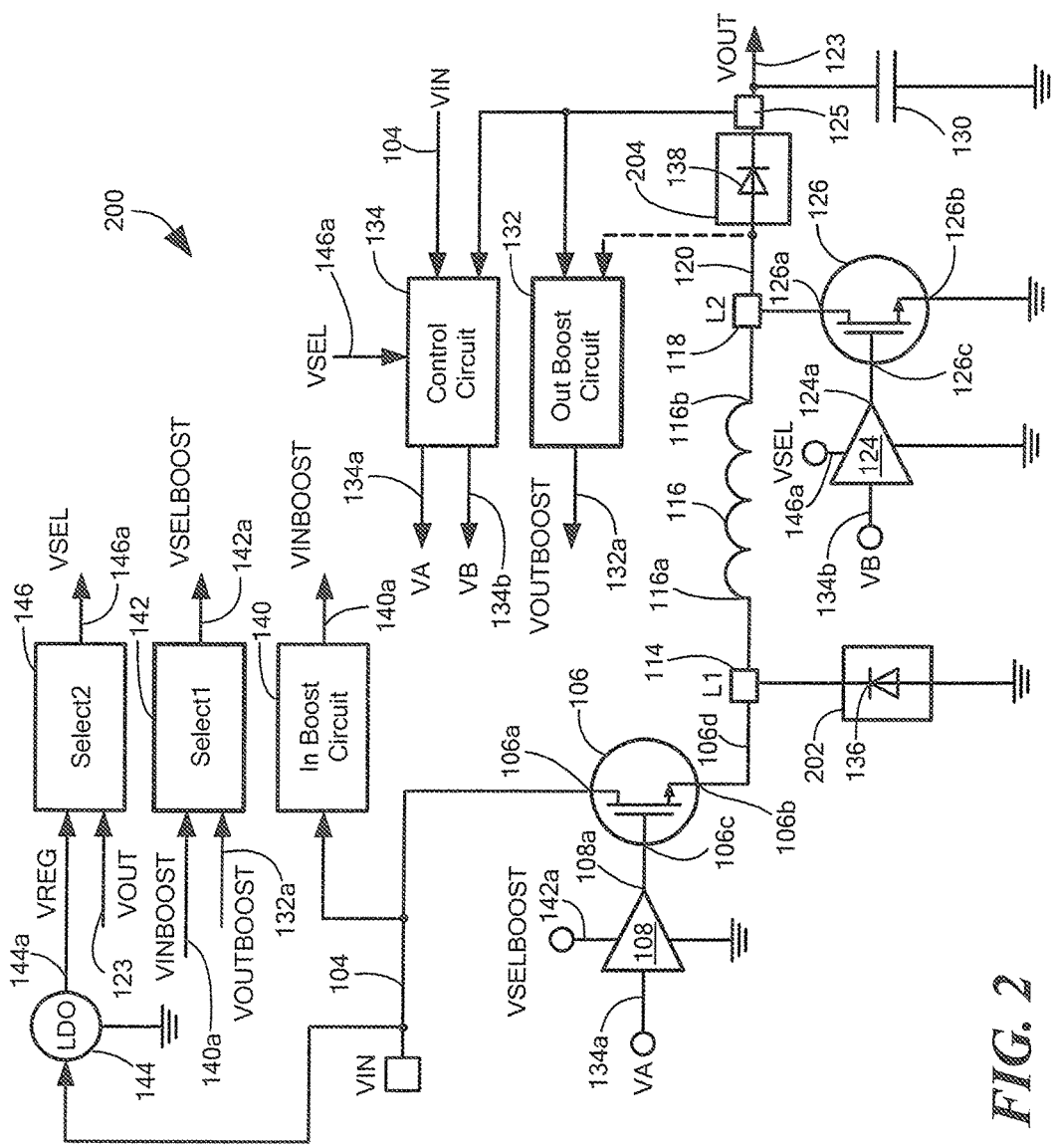
FIG. 2 is a block diagram showing another example of a buck-boost switching regulator that has the output voltage boost circuit, the input voltage boost circuit, the first and second voltage selection circuits and the control circuit of FIG. 1.

Referring now to FIG. 2, in which like elements of FIG. 1 are shown having like reference designations, a buck-boost switching regulator 200 uses active electronic components 202, 204 in place of the third and fourth electronic switches 110, 122 of FIG. 1. In some embodiments, the active electronic components 202, 204 are comprised of the above-described diodes 136, 138. Other active electronic components could also be used.

Operation of the buck-boost switching regulator 200 is substantially the same as operation of the buck-boost switching regulator 100 described above in conjunction with FIG. 1.

Figure 3:
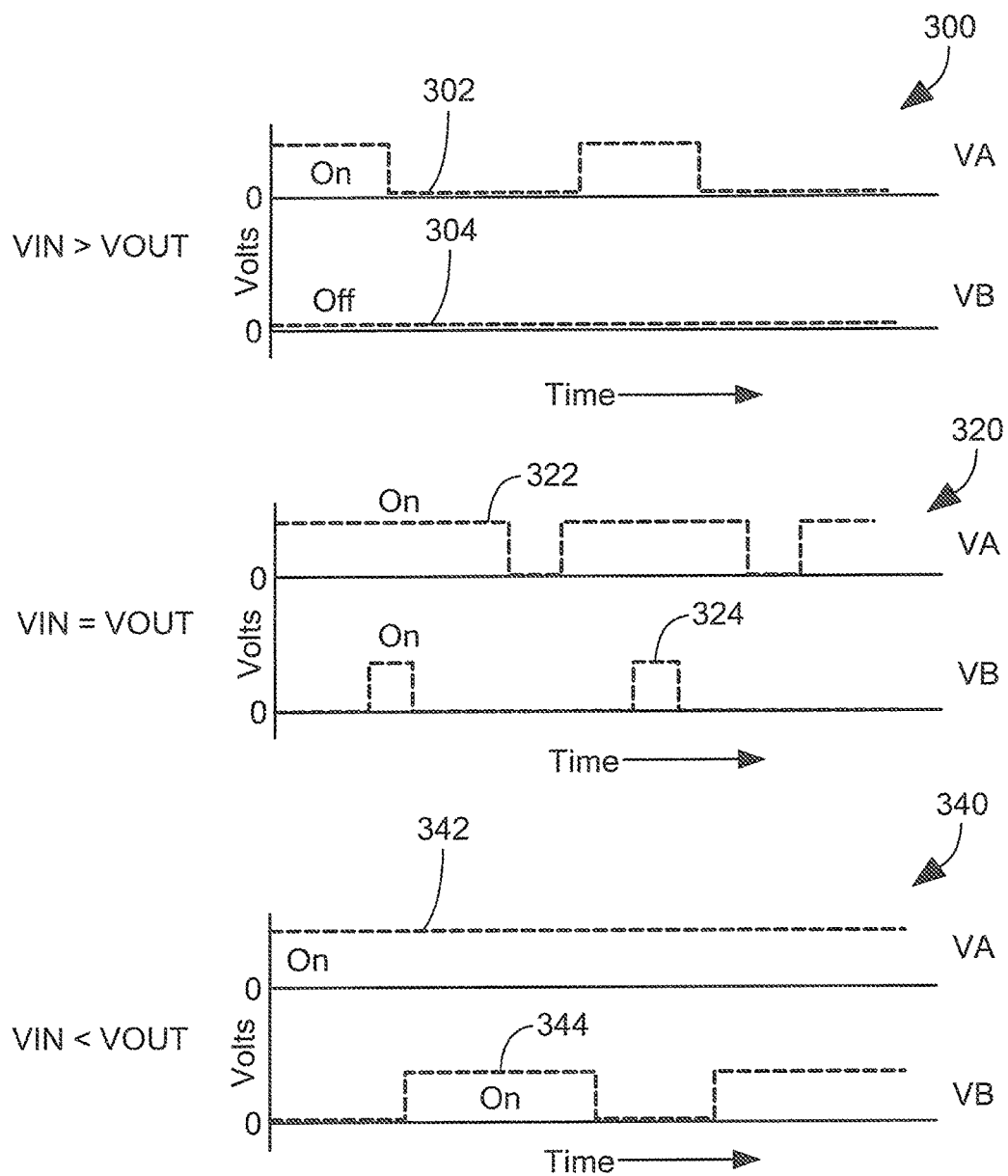
FIG. 3 is a set of graphs showing operation of control signals used in the buck-boost switching regulator of FIG. 1.

Referring now to FIG. 3, graphs 300, 320, 340 have vertical axes, each with two scales in units of volts in arbitrary units. In some examples, high states of signals 302, 304, 322, 324, 342, 344 are indicative of about ten volts. The graphs 300, 320, 340 also have horizontal axes with scales in units of time in arbitrary units. However, in some examples, fundamental frequencies of the signals 302, 304, 322, 324, 342, 344 are in the MHz range, for example, about two MHz.

Signals 302, 322, 342 are representative of the control signal (VA) 134a of FIGS. 1 and 2 in different modes of operation. Signals 304, 324, 344 are representative of the control signal (VB) 134b of FIGS. 1 and 2 in different modes of operation. High states of the signals 302, 322, 342 are representative of an on condition of the first electronic switch 106 and an off condition of the third electronic switch 110. High states of the signals 304, 324, 344 are representative of an on condition of the second electronic, switch 126 and an off condition of the fourth electronic switch 122.

The graph 300 is representative of the buck mode of operation of buck-boost switching regulators described herein. The graph 320 is representative of the buck-boost mode of operation of the buck-boost switching regulators described herein. The graph 340 is representative of the boost mode of operation of the buck-boost switching regulators and boost switching regulators described herein.

In the graph 300, i.e., in the buck mode of operation, the signal 302 toggles periodically, turning on and off the first electronic switch 106, and turning on and off the third electronic switch 110 in opposition to the first electronic switch 106. The signal 304 maintains a low state, resulting in the second electronic switch 126 being continuously off (and the fourth electronic switch 122 being continuously on).

In the graph 340, i.e., in the boost mode of operation, the signal 344 toggles periodically, turning on and off the second electronic switch 126, and turning on and off the fourth electronic switch 122 in opposition to the second electronic switch 126. The signal 342 maintains a high state, resulting in the first electronic switch 106 being continuously on (and the third electronic switch 110 being continuously off).

In the graph 320, i.e., in the buck-boost mode of operation, the signals 322, 324 both toggle periodically, turning on and off both the first and second electronic switches 106, 126, and turning on and off both the third and fourth electronic switches 110, 122 in opposition to the first and second electronic switches 106, 126.

The three modes of operation are described in greater detail in the above described U.S. patent application Ser. No. 14/615,050. For the three modes of operation of the graphs 300, 320, 340, a relative duty cycle of the signals can be different than those shown depending on how far away from the output voltage (VOUT) 123 is the input voltage (VIN) 104.

Let is suffice here to say that the control circuit 134 can operable to compare the output voltage (VOUT) 123 with a stable reference voltage (e.g., five volts), which can be generated within the control circuit 134. The output voltage (TOUT) 123 is slightly different in the three modes of operation. Thus, depending upon a value of the output voltage (VOUT) 123 relative to the reference voltage, the control circuit 134 can generate control signals 134a, 134b to be like those of graphs 300, 320, or 340, accordingly.

Further details of an illustrative control circuit, as described U.S. patent application Ser. No. 14/615,050, are described below in conjunction with FIGS. 13-15.

For the boost mode of operation of the graph 340, voltage at the source 106b of the first electronic switch 106 approaches the output voltage (VOUT) 123 (e.g., five volts) continuously. Still, the control signal 108b, when in a high state, is substantially above the output voltage (VOUT) 123 by operation of the boosted output voltage (VOUTBOOST) 132a used as the selected boosted voltage (VSELBOOST) to power the first buffer 108, and the first electronic switch 106 is able to turn on.

Figure 4:
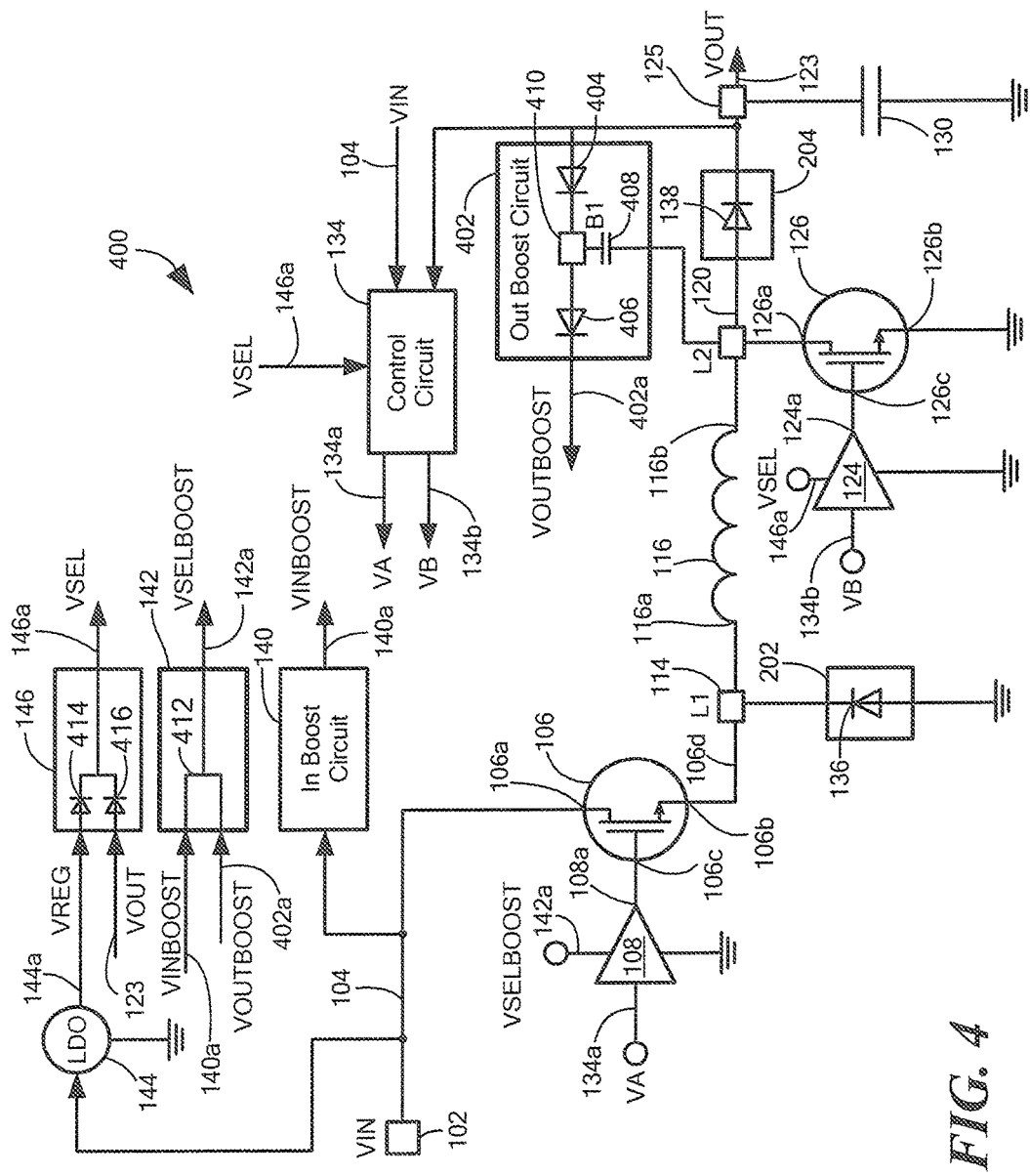
FIG. 4 is a block diagram showing another example of a buck-boost switching regulator that has an output voltage boost circuit in the form of a 2× charge pump, and also the input voltage boost circuit, the first and second voltage selection circuits, and also the control circuit of FIG. 1.

Referring now to FIG. 4, in which like elements of FIGS. 1 and 2 are shown having like reference designations, another example of the buck-boost switching regulator 400 includes a particular output voltage boost circuit 402, which can be the same as or similar to the output voltage most circuit 132 of FIGS. 1 and 2.

The output voltage boost circuit 402 is comprised of a 2× charge pump. The output voltage boost circuit 402 includes a first diode 404 coupled at a cathode end to the output voltage (VOUT) 123. The output voltage boost circuit 402 includes a second diode 408 coupled at a cathode end to an anode end of the first diode 404, forming a junction node. A capacitor 408 is coupled to at one end to the second end 116b of the inductor 116 and at a second end to the junction node.

In some embodiments, the output voltage boost circuit 402 can include an integrated circuit pin 410 at the junction node. The integrated circuit pin 410 allows for the capacitor 408, in some embodiments, to be outside of the above-described common integrated circuit substrate. The output voltage boost circuit 402 provides a boosted output voltage 402a that can be the same as or similar to the boosted output voltage 132a of FIGS. 1 and 2 and which can be used in the same way.

Operation of the boost circuit 402 is described more fully below in conjunction with FIG. 5. However, let it suffice here to say, that the boosted voltage 402 can be equal to the output voltage (VOUT) 123 minus one diode voltage drop resulting from the second diode 406. Therefore, for the output voltage (VOUT) 123 of for example, five volts, the boosted voltage 402a can be about 93 volts.

The output voltage boost circuit 402 operates differently in the above described three modes of operation. In order to operate as a charge pump, the output voltage boost circuit 402 must receive an AC signal at the inductor end of the capacitor 408. Referring again briefly to FIG. 3, it should be apparent that an AC signal exists at the inductor end of the capacitor 408 only for the graphs 320, 340, i.e., for the buck-boost and for the boost modes of operation. In contrast, for the buck mode of operation represented by the graph 300, the signal at the inductor end of capacitor 408 is a DC signal. Therefore, the output voltage boost circuit 402 automatically runs as a charge pump for two modes of operation, but reverts to a two diode pass-through for the third mode of operation, i.e., for the buck mode of operation.

Also shown, the first selection circuit 142 can merely couple the boosted input voltage (VINBOOST) 140a and the boosted output voltage (VOUTBOOST) 402a together in a wired OR configuration, since the output voltage boost circuit 402 and the input voltage boost circuit 140 (see, e.g., FIG. 7) can both have diode outputs. A highest one of the boosted input voltage (VINBOOST) 140a or the boosted output voltage (VOUTBOOST) 402a becomes the selected boosted voltage (VSELBOOST) 142a.

In other embodiments, the first selection circuit 142 can instead compare the boosted input voltage (VINBOOST) 140a and the boosted output voltage (VOUTBOOST) 402a to make the selection as a highest one of the voltages.

Also shown, the second selection circuit 146 can couple the regulated voltage (VREG) 144a and the output voltage (VOUT) 123 together in a wired-OR configuration using diodes 414, 416. A highest one of the regulated voltage (VREG) 144a and the output voltage (VOUT) 123 becomes the selected voltage (VSEL) 146a.

In other embodiments, the second selection circuit 146 can instead compare the regulated voltage (VREG) 144a and the output voltage (VOUT) 123 to make the selection.

It should be noted that the boost circuit 402 uses only one extra integrated circuit pin 410.

In some embodiments, the diodes 404, 406, 414, 416 can be integrated upon the above-described common integrated circuit substrate.

Figure 5:
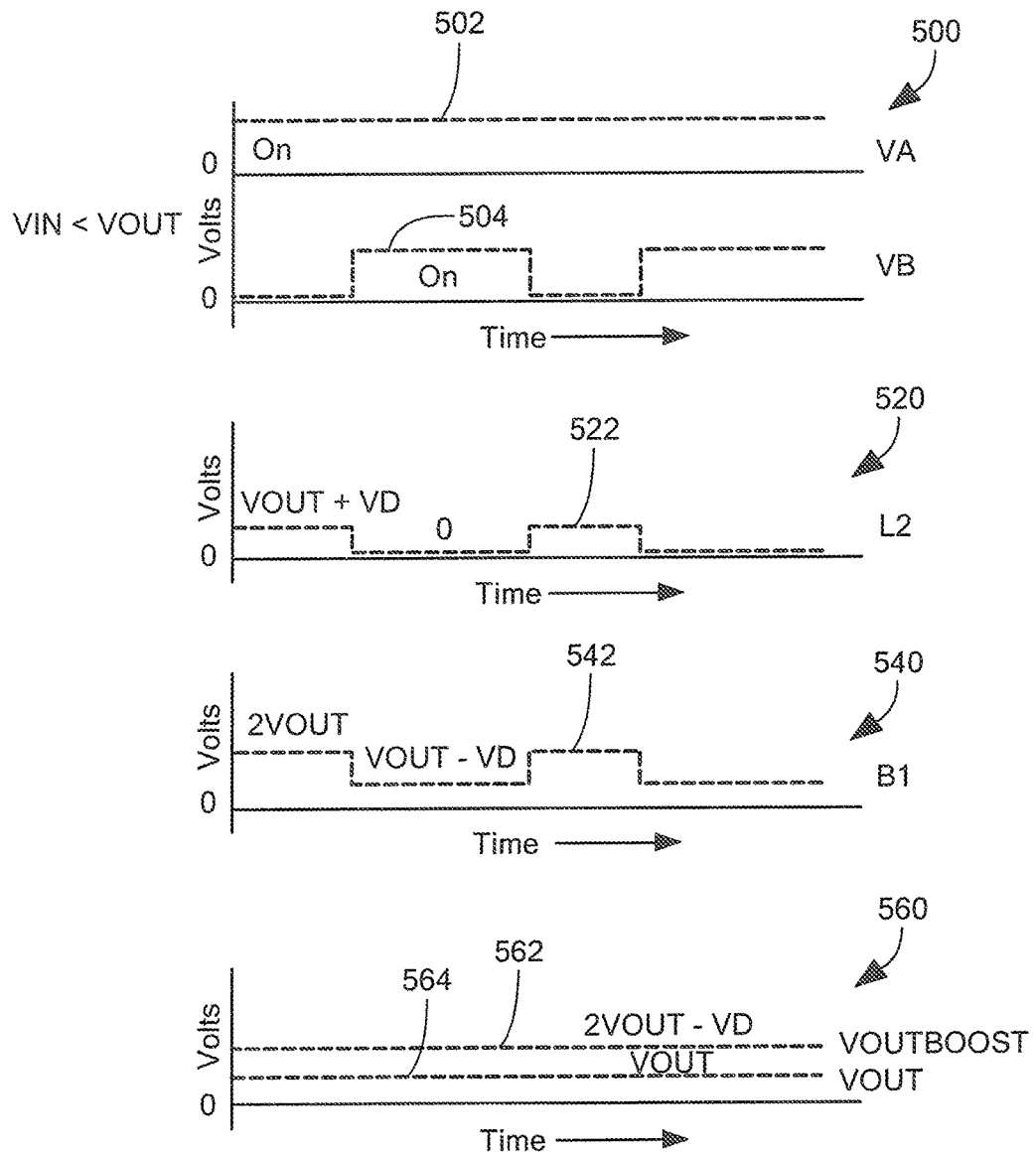
FIG. 5 is a set of graphs showing operation of the 2× charge pump used in the buck-boost switching regulator of FIG. 4.

Referring now to FIG. 5, graphs 500, 520, 540, 560 have vertical axes, each with scales in units of volts in arbitrary units, and some with two such scales. Particular examples of signal voltages are described below. The graphs 500, 520, 540, 560 also have horizontal axes with scales in units of time in arbitrary units. However, in some examples, fundamental frequencies of the signals 504, 522, 542 are in the MHz range, for example, about two MHz. The graphs 500, 520, 540, 560 describe some of the signals that appear in the buck-boost switching regulators described herein, and the buck-boost switching regulator 400 of FIG. 4 is used as a particular example.

The graph 500 is like the graph 340 of FIG. 3, and is representative of the above-described boost mode of operation for any of the buck-boost switching regulators (and boost switching regulators) described herein. The signal 504 is representative of the control signal (VB) 134b of FIGS. 1 and 2, and results in an AC signal 522 in graph 520, which appears at the inductor end of the capacitor 408 of FIG. 4.

Using the buck-boost switching regulator of FIG. 4 as an example, the signal 522 of FIG. 5 (i.e., signal 120 of FIG. 4) has high states approximately equal to a diode drop above the output voltage (VOUT) 123, e.g., 5.7 volts, and low states of approximately zero, or approximately one hundred millivolts above zero due to on resistance of the second electronic switch 126.

In the graph 540, a signal 542 is representative of a signal appearing at the junction node between the two diodes 404, 408 of FIG. 4. A high state of the signal 542 is approximately twice the output voltage (VOUT) 123, e.g., approximately ten volts. A low state of the signal 542 is approximately equal to the output voltage (VOUT) 123 minus a diode drop, e.g., approximately 4.3 volts.

A signal 562 is representative of a voltage appearing at the anode end of the diode 406, i.e., representative of the boosted output voltage (VOUTBOOST) 402a. The boosted output voltage is approximately twice the output voltage minus a diode drop, e.g., approximately 9.3 volts. A signal 564 is also shown, and is representative of the output voltage (VOUT) 123, e.g., approximately five volts.

As described above, the AC signal 522 only appears in the buck-boost mode of operation and in the boost mode of operation of the buck-boost switching regulators described herein. When in the buck mode of operation, instead of the AC signal 522, a DC voltage of approximately the output voltage (VOUT) 123 plus a diode voltage, e.g., approximately 5.7 volts, exists at the inductor end of the capacitor 408. In the buck mode of operation, the boosted output voltage (VOUTBOOST) 402a is approximately equal to the output voltage (VOUT) 123 minus two voltage drops, e.g., approximately 3.6 volts. Thus, the boosted input voltage (VINBOOST) 140a, being higher in voltage, instead becomes the selected boosted voltage (VSELBOOST) 142a.

Figure 6:
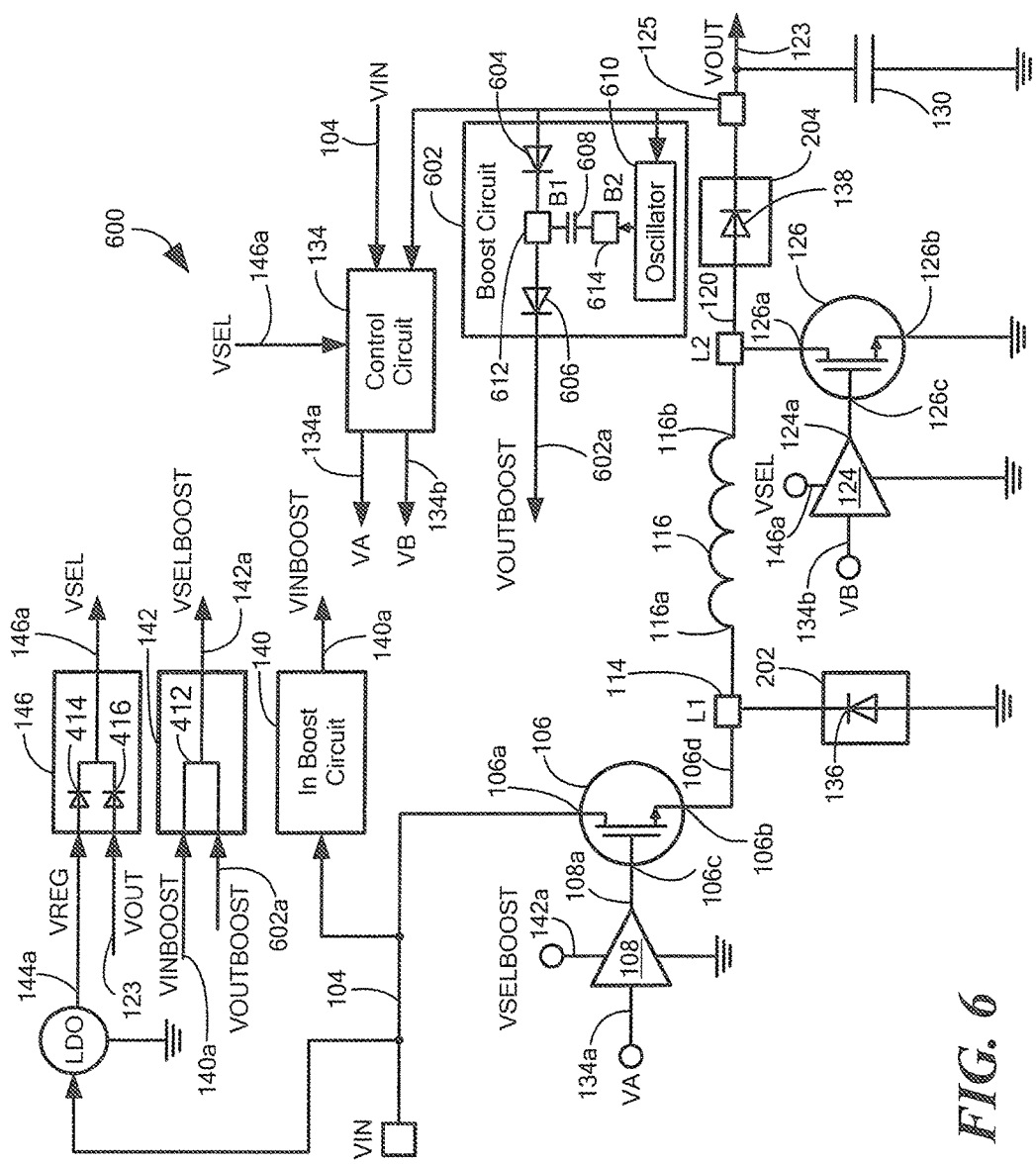
FIG. 6 is a block diagram showing another example of a buck-boost switching regulator that has an output voltage boost circuit in the form of a 2× charge pump that includes and oscillator and also the control circuit of FIG. 1.

Referring now to FIG. 6, in which like elements of FIGS. 1, 2 and 4 are shown having like reference designations, a buck-boost switching regulator 600 includes an output voltage boost circuit 602.

Like the output voltage boost circuit 402 of FIG. 4, the output voltage boost circuit 602 is comprised of a 2× charge pump. The output voltage boost circuit 602 includes a first diode 604 coupled at a cathode end to the output voltage (VOUT) 123. The output voltage boost circuit 602 includes a second diode 608 coupled at a cathode end to an anode end of the first diode 604, forming a junction node. An oscillator 610 is powered from the output voltage (VOUT) 123 (or alternatively, from the selected voltage (VSEL) 146a), and is configured to generate an oscillating AC signal. A capacitor 408 is coupled to at one end to receive the oscillating AC signal from the oscillator 610 at a second end to the junction node.

A frequency of the oscillator 610 can be similar to the above, described frequencies, e.g., about two MHz. However, use of the separate oscillator 610 can allow a higher frequency AC signal to the capacitor 608, e.g., up to about forty MHz. The higher frequency can result in an ability to use the capacitor 608 with a smaller value of capacitance than the capacitor 408 of FIG. 4.

In some embodiments, the output voltage boost circuit 602 can include two integrated circuit pins 612 (at the junction node) and 614 at one end of the capacitor 608. The integrated circuit pins 612, 614 allow for the capacitor 608, in some embodiments, to be outside of the above-described common integrated circuit substrate. The output voltage boost circuit 602 provides a boosted voltage 602a that is the same as or similar to the boosted output voltage 132a of FIG. 1 and that is used in the same way.

In some embodiments, the four diodes 604, 606, 414, 416 can be integrated upon the above-described common integrated circuit substrate.

Operation of the output voltage boost circuit 602 is similar to operation of the output voltage boost circuit 402 of FIG. 4. However, unlike the output voltage boost circuit 402 of FIG. 4, the output voltage boost circuit 602 includes its own oscillator 610, which can provide a stable boosted output voltage (VOUTBOOST) 602a in all three modes of operation.

It may not be desirable to use two extra pins 612, 614, as opposed to the one extra pin 410 of FIG. 4.

Figure 7:
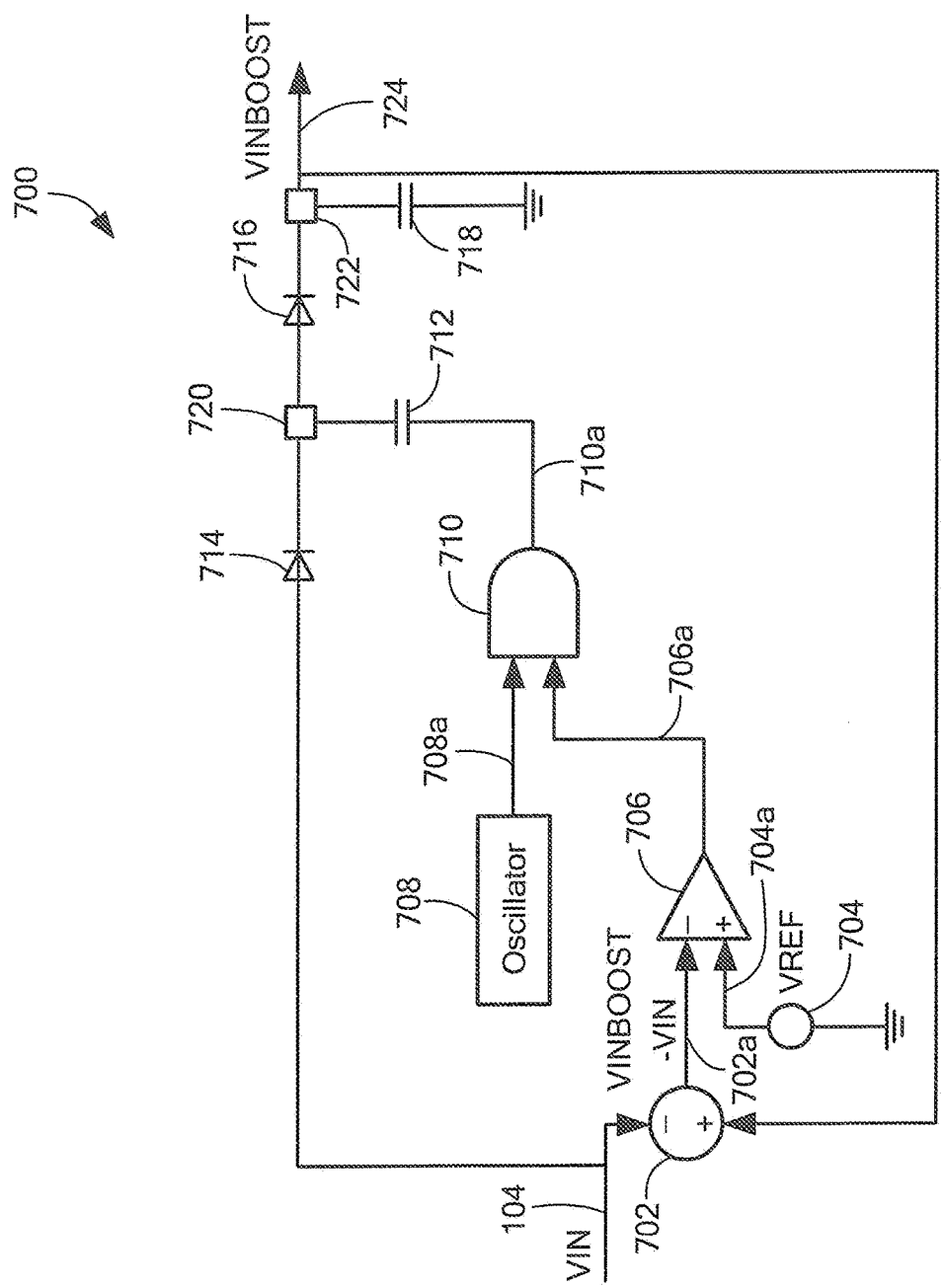
FIG. 7 is a block diagram showing an example of an input voltage boost circuit that can be used in the buck-boost switch regulators of FIGS. 1, 2, 4, and 6.
Figure 8:
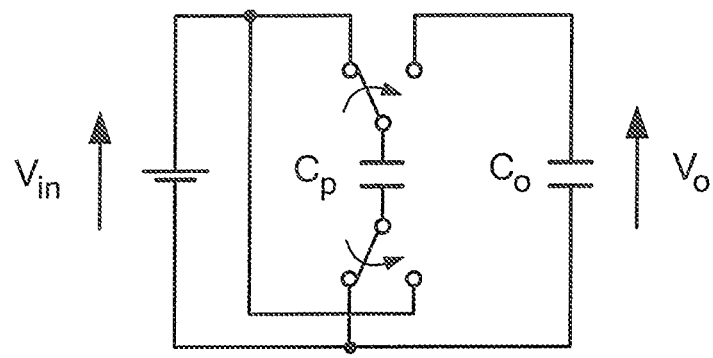
FIGS. 8-12 show exemplary alternate charge pumps that can be used in place of the charge pumps of FIGS. 4, 6, and 7.
Figure 9:
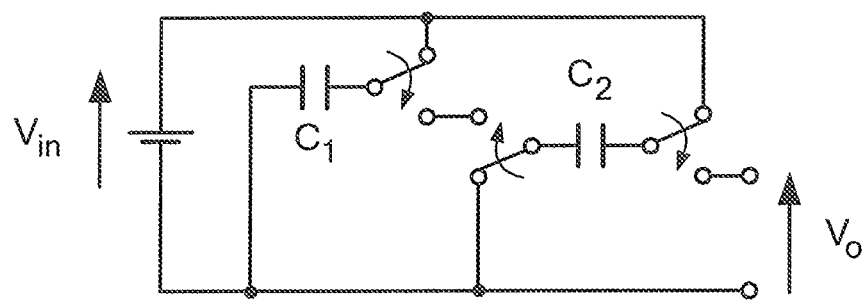
Figure 10:
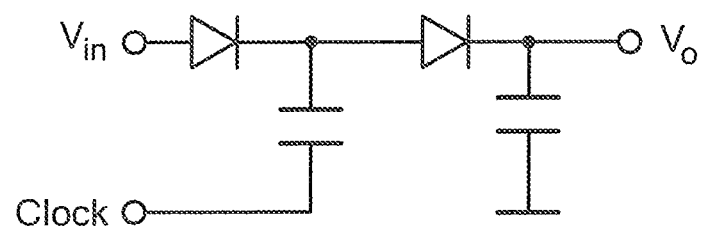
Figure 11:
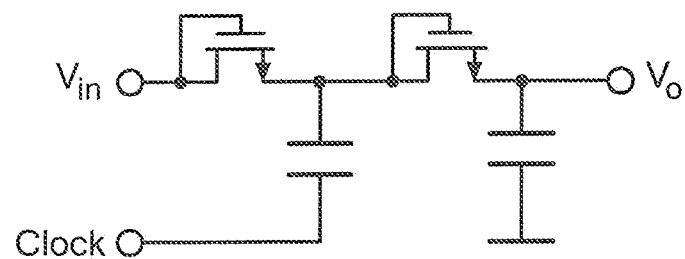

Referring now to FIG. 7, an input voltage boost circuit 700 can be the same as or similar to the input voltage boost circuit 140 of FIGS. 1, 2, 4, and 6.

The input voltage boost circuit 700 can include a differencing component 702 coupled to receive the input voltage 104 (FIGS. 1, 2, 4, 6) at an inverting terminal. An output terminal of the differencing component 702 is coupled to an inverting terminal of a comparator 706.

The comparator 706 can be coupled to receive a reference voltage 704a (e.g., six volts) from a reference voltage source 704 at a noninverting terminal. The comparator 706 is configured to generate a difference signal 706a.

A logic gate, for example, an AND gate 710, is coupled to receive the comparison signal 706a at a first input terminal.

An oscillator 708 is configured to generate a clock signal 708a coupled to a second input terminal of the AND gate 710. The AND gate 710 is configured to generate a logic signal 710a.

The logic signal 710a is an oscillating signal when the comparison signal 706a is in a high state. The logic signal 710a has a static low state when the comparison signal 706a is in a low state.

In some embodiments, the clock signal 708a can have a frequency between about two and about forty MHz.

Diodes 714, 716 with capacitors 712, 718 are coupled in a 2× charge pump arrangement to receive the logic signal 710a. In some embodiments, the capacitor 718 is omitted. A boosted input voltage (VINBOOST) 724 is generated at an anode end of the diode 716. The boosted input voltage (VINBOOST) 724 is the same as or similar to the boosted input voltage (VINBOOST) 140a of FIGS. 1, 2, 4, and 6.

The boosted input voltage (VINBOOST) 724 is coupled to a noninverting input of the differencing component 702.

In operation, when the input voltage 104 is below the reference voltage 704a, the boosted input voltage (VINBOOST) 724 is approximately double (double minus one voltage drop) the input voltage 104.

When the input voltage 104 is above the reference voltage 704a, the boosted input voltage (VINBOOST) 724 takes on a value of the input voltage 104 plus the reference voltage (VREF) 702a (e.g., VREF=six volts). Refer to Table 1 above for discussion of operation.

The input voltage boost circuit 700 can be integrated upon the above described common integrated circuit substrate. However, in some embodiments, the two capacitors 712, 718 are not upon the above-described common integrated circuit substrate, and two extra integrated pins 720, 722 may be needed to couple to the two capacitors 712, 718.

Referring now to FIGS. 8-11, four different configurations of charge pumps are shown, each capable of generating at its respective output a voltage higher than a voltage provided at its respective input. The charge pumps of FIGS. 8-11 can be used in the output voltage boost circuits described herein. Each of these charge pumps is a doubling charge pump configured to generate a voltage approximately double the voltage provided at the input. Each one of the charge pumps comprises two capacitors.

It will be understood how to use as the output voltage boost circuits described herein other charge pumps that can triple or quadruple an input voltage.

A size of the charge pump capacitors is selected based upon a variety of factors. The factors include, but are not limited to, a frequency are which charge pump switches are toggled or a frequency used as a clock signal coupled to the charge pumps, an average current draw extracted from the charge pumps, and an amount of ripple that is desired in the boosted voltage.

Figure 12:
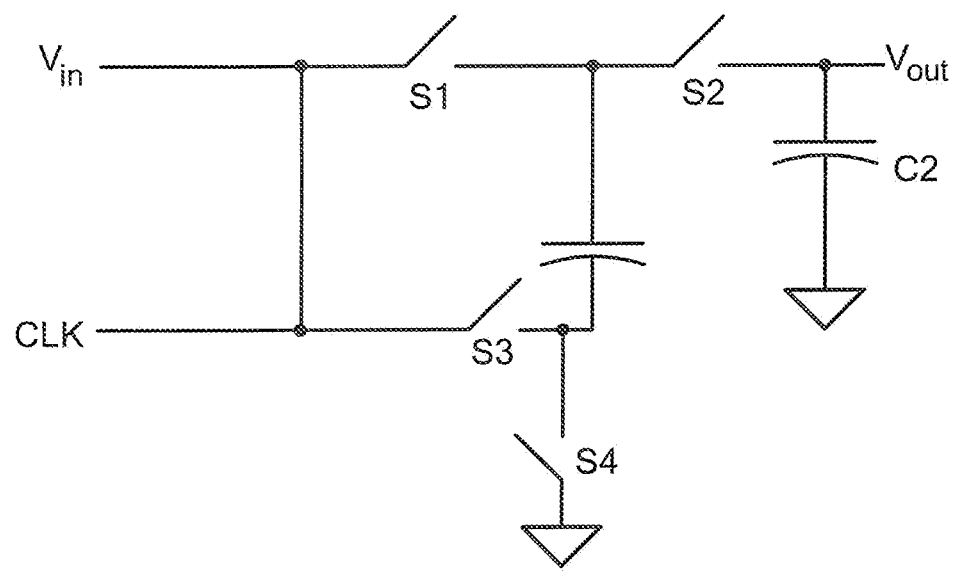

Referring now to FIG. 12, another exemplary charge pump acts as a doubling charge pump. The charge pump of FIG. 12 can be used in the output voltage boost circuits described herein The charge pump includes four switches, S1-S4 disposed upon a substrate and two capacitors disposed apart from the substrate (hut which, in some embodiments, can be upon the substrate). A clock signal, CLK, is operable to close some of the switches at any particular time, and to close other ones of the switches at other times.

In a first phase of operation (i.e., during a first state of the clock signal), the switches S1, S4 are closed and the switches S2, S3 are open. In a second phase of operation (i.e., during a second different state of the dock signal), the switches S2, S3 are closed and the switches S1, S4 are open.

In some embodiments of the charge pumps of FIGS. 8-12, the clock signal has a frequency of about two to about forty MHz, the current draw from any one of output voltage boost circuits is about 1 mA, and the allowable ripple from the charge pumps is about 50 mV. At 40 MHz, these factors result in charge pump capacitors with values of about 100 pF and 100 nF.

It is possible to fabricate capacitors shown herein directly upon a substrate using integrated circuit fabrication techniques, e.g., metal layers separated by a dielectric material. Some techniques are described in U.S. Pat. No. 7,573,112, issued Aug. 11, 2009, assigned to the assignee of the present application, and incorporated by reference herein in its entirety. In some embodiments, the capacitors of the charge pumps of FIGS. 4, 6, 7, and 8-12 are fabricated by such techniques.

Clock signals shown in FIGS. 8-12 can be the same as or similar to AC signals received by the capacitors 408, 608 of FIGS. 4, 6, and 7. Inputs shown in FIGS. 8-12 can be the same as or similar to the output voltage (VOUT) 123 received by the diodes 404, 604 of FIGS. 4, 6, and 7.

Figure 13:
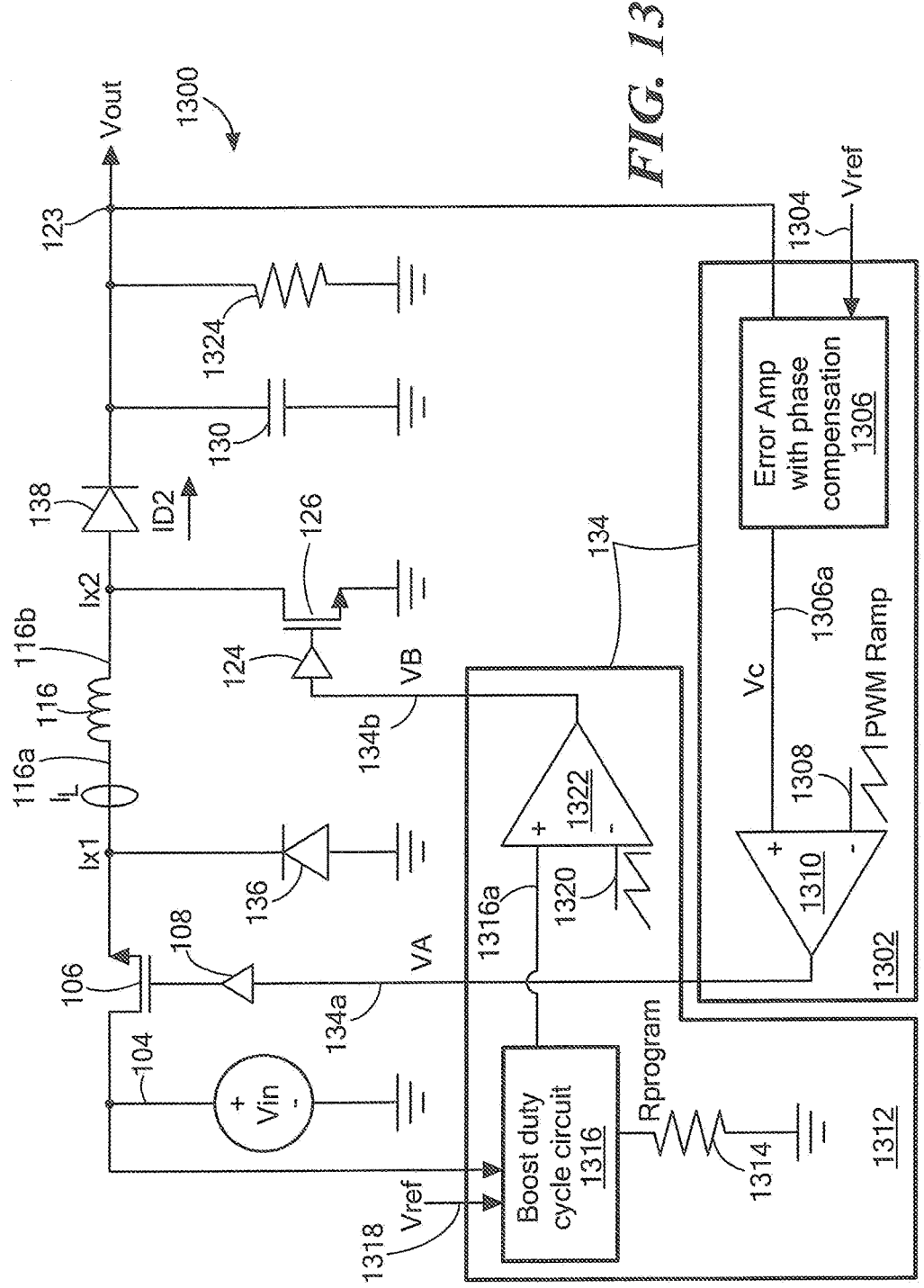
FIG. 13 is a block diagram showing an example of a buck-boost switching regulator, and, in particular, showing further details of the control circuit of FIGS. 1, 2, 4, and 6, which includes a feed forward control circuit.

Referring now to FIG. 13, in which like elements of FIGS. 1, 2, 4 and 6 are shown having like reference designations, another example of a buck boost switching regulator 1300 shows further details of the control circuit 134 described in conjunction with figures above.

It should be understood that the buck-boost switching regulator 1300 can include one or more other elements of FIGS. 1, 2, 4, and 6, though they are not shown.

The buck-boost switching regulator 1300 includes the first electronic switch 106 (sometimes referred to as a buck switch), the second electronic switch 126 (sometimes referred to as a boost switch), the first diode 136, the second diode 138, the inductor 116, the first logic buffer 108, the second logic buffer 124, and the capacitor 130 coupled as shown above in FIG. 2. A resistor 1324 can represent a load.

As described above a least in conjunction with FIG. 3, the buck-boost switching regulator 1300 can operate in a buck-boost mode of operation in which the first and second electronic switches 124 and 126 are turned on and off, a boost mode of operation in which the first electronic, switch 106 is turned on and the second electronic switch 126 is turned on and off, or in a buck mode of operation in which the second electronic switch 126 is kept off and the first electronic switch 106 is turned on and off. The duty cycle of the buck switch Q1 may be referred to as the buck duty cycle (i.e., $D_{buck}$) and the duty cycle of the boost switch Q2 may be referred to as the boost duty cycle (i.e., $D_{boost}$). Here, during the buck-boost mode of operation, the first and second electronic switches 106, 126 are independently controlled as described above and below and the first electronic switch 106 is turned on and of at a buck duty cycle and the second electronic switch 126 is turned on and off at a boost duty cycle. In the illustrative embodiment, the buck-boost switching regulator 1300 operates predominantly in the buck mode of operation and sometimes in the buck-boost mode of operation, although scenarios are possible as explained below.

As described above, conduction of the first and second electronic switches 106, 126 is controlled by the control circuit 134. The control circuit 134 can include a feedback control circuit 1302 and a feed forward control circuit 1312, which generate the above-described control signals 134a, 134b, respectively.

The feedback control circuit 1302 can include an error amplifier 1306 responsive to the output voltage (VOUT) 123 (as may be provided by a sense resistor or resistor divider, not shown) and to a reference signal (Vref) 1304. The error amplifier 1306 can be configured to generate an error signal 1306a proportional to a difference between the output voltage (VOUT) 123 and the reference signal (Vref) 1304. A comparator 1310 can be responsive to the error signal 1306a and to a PWM (pulse width modulated) ramp signal 1308 to generate the first control signal 134a coupled to the first logic buffer 108. The feedback control circuit 1302 can implement voltage mode control in which the first control signal 134a establishes a duty cycle to generate a predetermined output voltage (VOUT) 123, or current mode control in which the PWM ramp signal 1308 is based in part on an inductor current (i.e., IL) and the first control signal 134a establishes a duty cycle to generate a predetermined inductor current, IL.

The feed forward control circuit 1312 is responsive to the input voltage 104 and is configured to generate the second control signal 134b coupled to the second logic buffer 124. By controlling the second electronic switch 126 with the feed forward control circuit 1312 that is decoupled from the output voltage (VOUT) 123 (rather than with a feedback control circuit for example, as is conventional), loop stability of the buck-boost switching regulator 1300 is improved, since a right-hand plane zero that requires significantly different compensation requirements than those of the feedback control loop circuit 1302 is eliminated.

The boost duty cycle $D_{boost}$ established by the second control signal 134b can be programmable in order to achieve a desired, predetermined, nominal output voltage (VOUT) 123. To this end, the feed forward control circuit 1312 can include a programmable device 1314, here shown in the form of a resistor 1314, a boost duty cycle circuit 1316 coupled to the programmable device 1314 and responsive to a reference signal 1318, and a comparator 1322 that is responsive to an output signal 1316a of the boost duty cycle circuit 1316 and to a ramp signal 1320, as shown.

The programmable device 1314 can be selected based on a desired, predetermined, nominal output voltage (VOUT) 123 and establishes operational conditions (i.e., a relationship between relative levels of the input voltage 104 and the output voltage (VOUT) 123) under which the buck-boost switching regulator 1300 transitions between the different modes of operation (e.g., between the buck mode of operation and the buck-boost mode of operation). More particularly, as shown below, a resistance of resistor 1314 may be proportional to the predetermined output voltage (VOUT) 123 plus a forward voltage drop of the second diode 138.

As used herein, the term "boost duty cycle $D_{boost}$," is used to refer to a duty cycle of the second electronic switch (also sometimes referred to as a boost switch) and the term "buck duty cycle $D_{buck}$," is used to refer to a duty cycle of the first electronic switch 106 (also sometimes referred to as a buck switch).

Various circuitry and techniques are possible to implement the programmable feed forward control circuit 1312. One example feed forward control circuit is described below in conjunction with FIG. 14 Before discussing the example feed forward control circuit however, it is helpful to consider a desired boost duty cycle $D_{boost}$ as generated by the programmable feed forward control circuit 81312.

The transfer function of the buck-boost switching regulator 1300 in the buck-boost mode of operation is given by:

$$Vout \cong Vin \times \frac{D_{buck}}{1 - D_{boost}} - V_{fb} \qquad (1)$$

where:
$V_{fb}$ is the forward voltage drop of the second diode 138;
Vout=the output voltage (VOUT) 123; and
Vin=the input voltage (VIN) 104.

In order to achieve stable feed forward control of the second electronic switch 126, it is desirable to minimize a change in the buck duty cycle $D_{buck}$ over variations in the input voltage 104. Considering a simple perturbation over the output voltage (VOUT) 123, the input voltage (VIN) 104, the buck duty cycle $D_{buck}$, and the boost duty cycle $D_{boost}$, and assuming that the forward voltage drop across the second diode 138 is substantially constant, we have:

$$\widetilde{V_{out}} = \qquad (2)$$
$$\widetilde{V_{in}} \times \frac{D_{buck}}{1 - D_{boost}} + Vin \times \frac{\widetilde{D_{buck}}}{1 - D_{boost}} + Vin \times \frac{D_{buck}}{(1 - D_{boost})^2} \times \widetilde{D_{boost}}$$

In order to have a simple buck conversion with the output voltage (VOUT) 123 modulated by the buck duty cycle only, or:

$$\widetilde{V_{out}} = Vin \times \frac{\widetilde{D_{buck}}}{1 - D_{boost}} \qquad (3)$$

we need to have:

$$\widetilde{V_{in}} \times \frac{D_{buck}}{1 - D_{boost}} + Vin \times \frac{D_{buck}}{(1 - D_{boost})^2} \times \widetilde{D_{boost}} = 0 \qquad (4)$$

or:

$$\frac{\widetilde{V_{in}}}{Vin} = -\frac{\widetilde{D_{boost}}}{1 - D_{boost}} \qquad (5)$$

One solution to equation (5) for the boost duty cycle $D_{boost}$ is given by:

$$D_{boost} = 1 - C \times Vin \qquad (6)$$

where C is a constant coefficient. For a specific target output voltage $V_{out}^0$ and buck duty target $D_{buck}^0$, equation (1) can be expressed as:

$$V_{out}^0 \cong Vin \times \frac{D_{buck}^0}{1 - D_{boost}} - V_{fb} \qquad (7)$$

Equation (7) can be used to express the boost duty cycle $D_{boost}$ as follows:

$$D_{boost} = 1 - \frac{D_{buck}^0}{V_{out}^0 + V_{fb}} \times Vin \qquad (8)$$

Equations (6) and (8) can be used to provide the following expression for C, given a desired, predetermined value of the buck duty cycle (i.e., $D_{buck}^0$) and the output voltage $V_{out}$ (i.e., $V_{out}^0$):

$$C = \frac{D_{buck}^0}{V_{out}^0 + V_{fb}} \quad (9)$$

where $D_{buck}^0$ is a desired buck duty cycle when the buck-boost switching regulator 1300 transitions from the buck mode of operation to the buck-boost mode of operation.

Thus, the desired boost duty cycle, $D_{boost}$, can be expressed as follows:

$$D_{boost} \cong 1 - \frac{D_{buck}^0}{V_{out}^0 + V_{fb}} \times Vin \quad (10)$$

In practice, it is desirable to have $0 \leq D_{boost} \leq D_{buck} \leq D_{buckmax}$, so that the buck-boost switching regulator 1300 has satisfactory dynamic controllable range.

Figure 14:
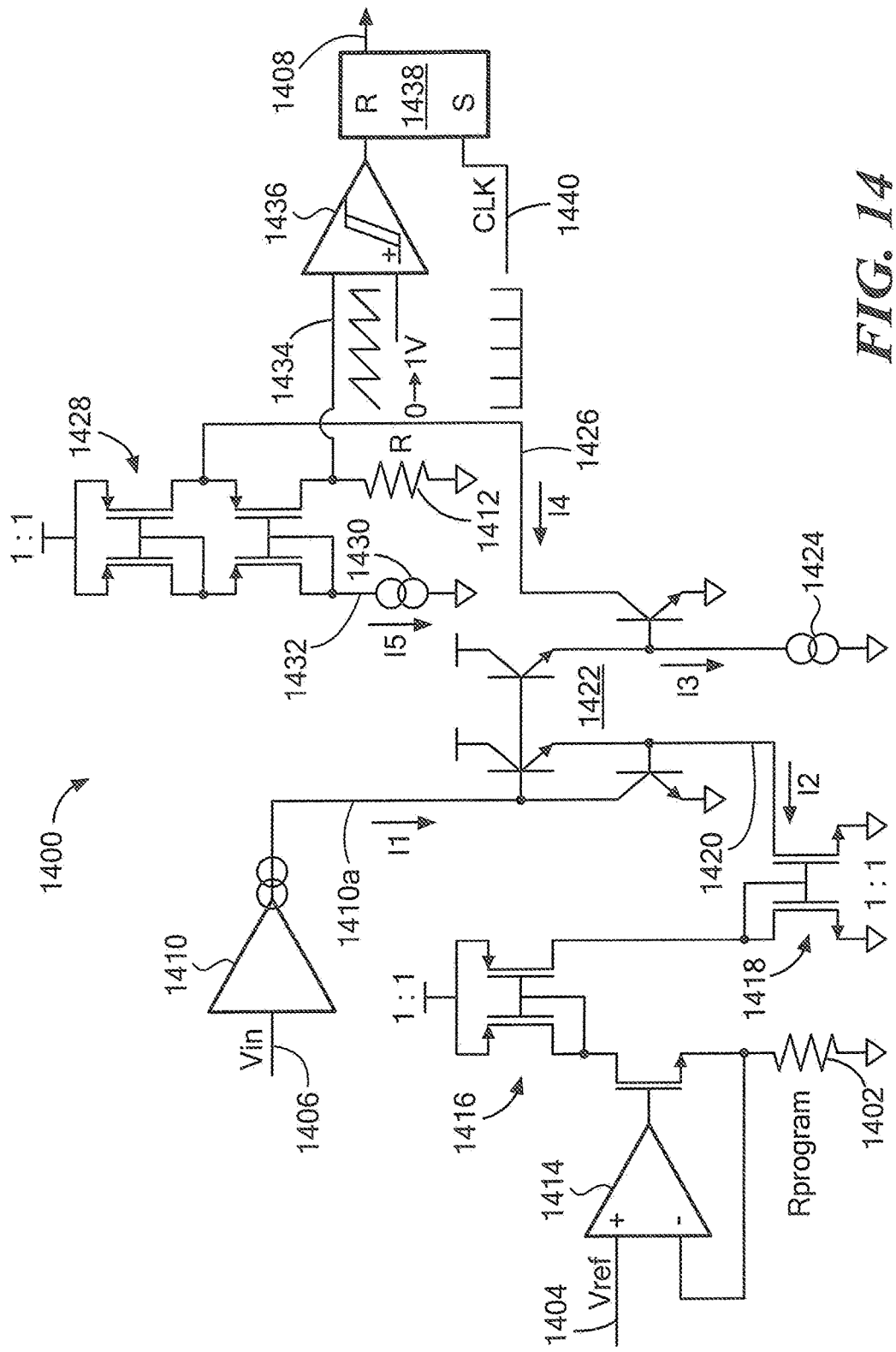
FIG. 14 is a block diagram showing further details of an illustrative feed forward control circuit of FIG. 13.

Referring now to FIG. 14, an illustrative feed forward control circuit 1400 (as may be used to provide the feed forward control circuit 1312 of FIG. 13) is shown. Like the feed forward control circuit 1312 of FIG. 13, the feed forward control circuit 1400 includes a programmable device 1402, here a resistor 1402 with a programmable or changeable resistance value, Rprogram, and is responsive to a reference signal 1404 and an input voltage 1406, which can be the same as or similar to the reference signal 1318 and the input voltage 104 of FIG. 13. The feed forward control circuit 1440 can be configured to generate a control signal 1408 which may the same as or similar to the second control signal 134b (FIGS. 1, 2, 4, 6, 13). More particularly, the control signal 1408 can have a duty cycle given by equation (10) above.

The feed forward control circuit 1400 includes a transconductance amplifier 1410 to generate a first current 1410a (I1) equal to the input voltage 1406 (YIN) multiplied by a transconductance 1/(M×R) of the transconductance amplifier 1410, where R is a resistance of a resistor 1412 and M is a multiplier so that the first current 1410a (I1)=Vin/(M×R).

A voltage-follower-configured operational amplifier 1414 is coupled to the programmable resistor 1402 to generate a current proportional to the reference signal 1404 divided by a resistance of the programmable resistor 1402, which current can be buffered with current mirrors 1414, 1418, as shown, to provide a second current 1412 (I2).

A transistor network 1422 configured as a multiplier is responsive to the first and second currents 1410a, 1420 and to a current source 1424 (as may have a current value of one volt divided by a resistance of resistor 1412) to generate a fourth current 1426 (I4) given by:

$$I4 = \frac{\frac{Vin}{M \times R} \times \frac{Vref}{Rprogram}}{\frac{1V}{R}} \quad (11)$$

The fourth current 1426 (I4) is coupled to a current mirror network 1428 that has a current source 1430 for generating a fifth current 1432 (I5) (as may have a current value of one volt divided by the resistance of resistor 1412) in a first leg and the resistor 1412 in a second leg, as shown. A voltage across the resistor 1412 generates a signal 1434 (which may be the same as or similar to the output signal 1316a of the boost duty cycle circuit 1316 of FIG. 13). The signal 1434 can be expressed as a maximum as follows:

$$Vboost = \max\left(1V - \frac{Vin}{Rprogram} \times \frac{Vref}{1V} \times \frac{R}{M}, 0\right) \quad (12)$$

The signal 1434 is coupled to an inverting input of a comparator 1436 that has a noninverting input responsive to the signal 1434, which may be a ramp signal (that may be the same as or similar to the ramp signal 1320 of FIG. 13) that may, for example, be a ramp signal with a voltage range of zero to one volt. An output signal 1436a generated by the comparator 1436 can be coupled to a reset input of a flip-flop 1438 that is set by a clock signal 1440 to generate the control signal 1408.

With the feed forward control circuit 1400 of FIG. 14, a value (Rprogam) of the programmable resistor 1402 is proportional to the desired, predetermined output voltage $V_{out}^0$ (i.e., output voltage 123 of FIGS. 1, 2, 4, 6, and 13), and, more particularly, can be expressed as follows:

$$R_{program} = (V_{out}^0 + V_{fb}) \times \frac{\frac{V_{ref}}{M \times 1V^2}}{D_{buck}^0} \times R \quad (13)$$

where R is a value of the resistor 1412.

It will be appreciated that various other circuits and techniques are possible to still realize the boost duty cycle expression of equation (10). For example, while the feed forward control circuit 1400 is a predominantly analog implementation, portions or all of the feed forward control circuit can be implemented with digital circuitry and techniques.

Figure 15:
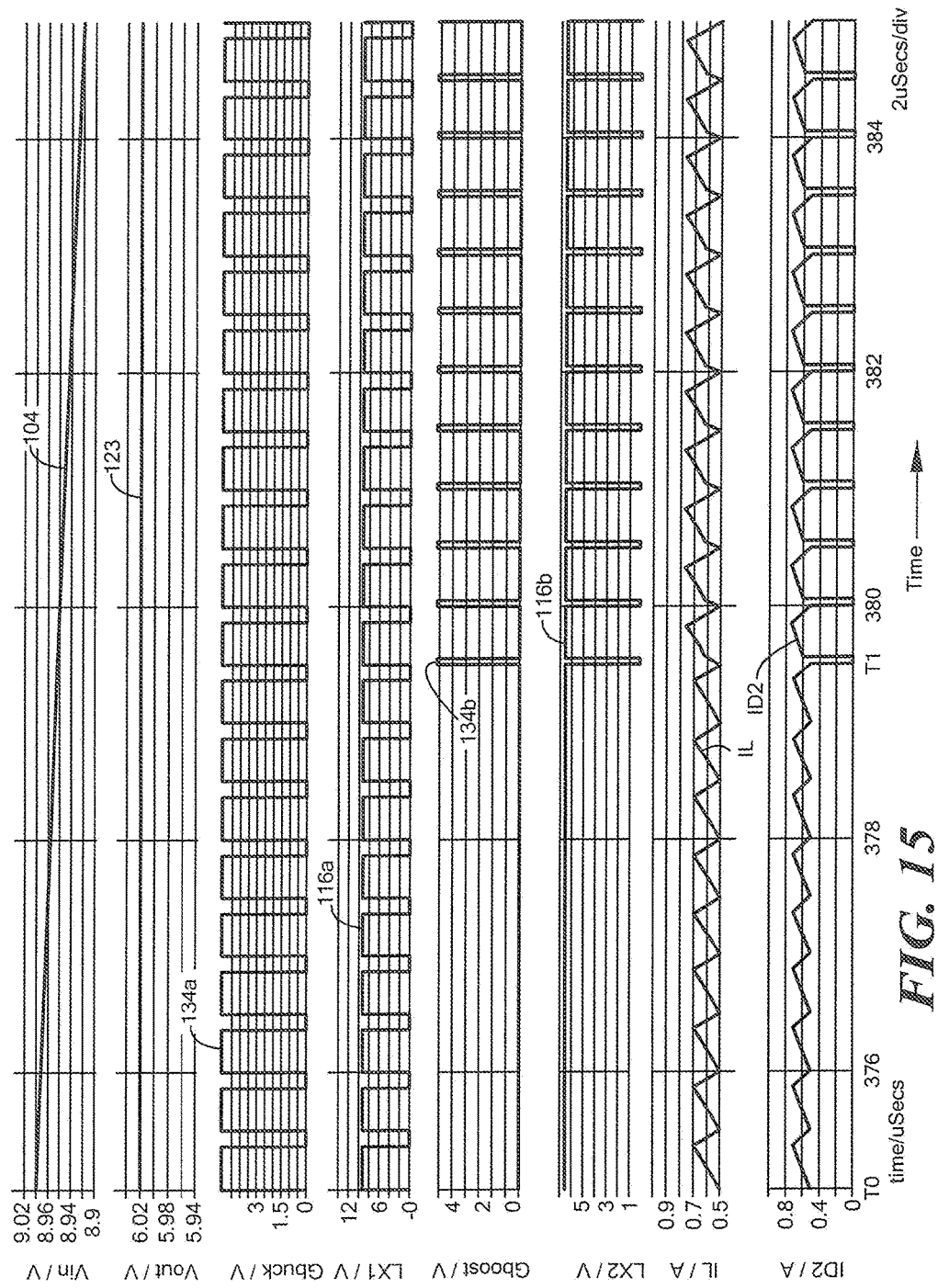
FIG. 15 is a graph showing signals associated with the buck-boost switching regulator of FIG. 13 and of the illustrative feed forward control circuit of FIG. 14.

Referring now to FIG. 15, certain waveforms associated with the buck-boost switching regulator 1300 of FIG. 13 are shown, including the input voltage (VIN) 104 the output voltage (VOUT) 123, the first control signal 134a, a voltage 116a at a first terminal of the inductor 116, the second control signal 134b, a voltage 1161) at a second terminal of the inductor 116, a current through inductor 116 (i.e., IL), and a current through the second diode 138 (e.g., ID2).

The waveforms of FIG. 15 correspond to operation of the buck-boost switching regulator 1300 when the predetermined, nominal output voltage (VOUT) 123 is set to 6.0 volts, and illustrate operation when the input voltage (VIN) 104 falls from approximately 9.0 volts to approximately 8.92 volts. In this particular example, the programmable resistor 1314 may have a value on the order of approximately 64KΩ as determined by equation (13) corresponding to a nominal output voltage (i.e., $V_{out}^0$) of 6.0 volts, a reference voltage 1404 (FIG. 14) on the order of approximately 0.7V, a resistance of resistor 1412 (FIG. 14) on the order of approximately 100KΩ, and a buck duty cycle at the transition from buck mode to buck-boost mode (i.e., $D_{buck}^0$) on the order of approximately 0.7, or 70%, a value M of 10, and a forward voltage drop $V_{fb}$ of the second diode 138 on the order of approximately 0.4 volts.

During a first time period from T0 to T1, the buck-boost switching regulator 1300 operates in the buck mode in which the second electronic switch 126 (the boost switch) is off and the first electronic switch 106 (the buck switch) is turned on and off at a buck duty cycle sufficient to maintain a constant output voltage (VOUT) 123. When the input voltage (VIN) 104 falls to approximately 8.96 volts at the time T1, the buck-boost switching regulator 1300 transitions to the buck-boost mode of operation in which both the first electronic switch 106 and the second electronic switch 126 are turned on and off. More particularly, here, three phases of buck-boost operation are implemented. During each buck-boost cycle, the first and second electronic switches 106, 126 are simultaneously on during a first phase, the first electronic switch 106 is on and the second electronic switch 126 is off during a second phase, and both the first and second electronic switches 106, 126 are off during a third phase, as shown.

All references cited herein are hereby incorporated herein by reference in their entirety.

Having described preferred embodiments, which serve to illustrate various concepts, structures and techniques, which are the subject of this patent, it will now become apparent that other embodiments incorporating these concepts, structures and techniques may be used. Accordingly, it is submitted that that scope of the patent should not be limited to the described embodiments but rather should be limited only by the spirit and scope of the following claims.

What is claimed is:

1. A switching voltage regulator for receiving an input voltage and for generating a regulated output voltage, the switching regulator capable of a buck mode of operation, a boost mode of operation, and a buck-boost mode of operation, the switching regulator comprising:
   an inductor having an input terminal and an output terminal, the input terminal of the inductor coupled to an input voltage node configured to receive the input voltage;
   a first electronic switch having a first current passing terminal, a second current passing terminal, and a control terminal, wherein the first current passing terminal is coupled to the input voltage node, the second terminal coupled to the input terminal of the inductor, and the control terminal is coupled to receive a first control signal;
   an output voltage boost circuit coupled to receive the regulated output voltage and configured to generate a boosted output voltage related to and higher than the regulated output voltage; and
   a first active electronic component powered from a voltage approximately equal to the boosted output voltage when the switching regulator is in the boost mode of operation, wherein the first active electronic component has an output terminal at which the first control signal is generated.

2. The switching voltage regulator of claim 1, wherein the first electronic switch comprises an n-channel field effect transistor having a drain, a source, and a gate, wherein the first current passing terminal comprises the drain, the second current passing terminal comprises the source, and the control terminal comprises the gate.

3. The switching voltage regulator of claim 2, wherein the output voltage boost circuit comprises a charge pump.

4. The switching voltage regulator of claim 3, wherein the charge pump comprises:
   a first diode having a cathode end and an anode end;
   a second diode having an anode end and a cathode end, wherein the anode end of the first diode is coupled to receive the regulated output voltage, the cathode and of the first diode is coupled to the anode end of the second diode at a junction node, and the boosted output voltage appears and cathode end of the second diode; and
   a capacitor coupled between the output terminal of the inductor and the junction node.

5. The switching voltage regulator of claim 3, wherein the charge pump comprises:
   a first diode having a cathode end and an anode end;
   a second diode having an anode end and a cathode end, wherein the anode end of the first diode is coupled to receive the regulated output voltage, the cathode and of the first diode is coupled to the anode end of the second diode at a junction node, and the boosted output voltage appears and cathode end of the second diode;
   an oscillator powered from the regulated output voltage and configured to generate an oscillating signal; and
   a capacitor having first and second terminals, the first terminal coupled to receive the oscillating signal and the second terminal coupled to the junction node.

6. The switching voltage regulator of claim 1, further comprising:
   a second electronic switch having a first current passing terminal, a second current passing terminal, and a control terminal, wherein the first current passing terminal is coupled to the output terminal of the inductor, the second current passing terminal is coupled to a reference voltage source, and the control terminal is coupled to receive a second control signal; and
   a second active electronic component powered from a higher one of the regulated output voltage or a fixed regulated voltage, wherein the second active electronic component has an output terminal at which the second control signal is generated.

7. The switching voltage regulator of claim 6, wherein the first electronic switch comprises a first n-channel field effect transistor and the second electronic switch comprises a second n-channel field effect transistor,
   wherein the first n-channel field effect transistor comprises a drain, a source, and a gate, wherein the first current passing terminal of the first n-channel field effect transistor comprises the drain of the first in-channel field effect transistor, the second current passing terminal of the first n-channel field effect transistor comprises the source of the first n-channel field effect transistor, and the control terminal of the first n-channel field effect transistor comprises the gate of the first n-channel field effect transistor,
   wherein the second n-channel field effect transistor comprises a drain, a source, and a gate, wherein the first current passing terminal of the second n-channel field effect transistor comprises the drain of the second n-channel field effect transistor, the second current passing terminal of the second n-channel field effect transistor comprises the source of the second n-channel field effect transistor, and the control terminal of the second n-channel field effect transistor comprises the gate of the second n-channel field effect transistor.

8. The switching voltage regulator of claim 7, wherein the output voltage boost circuit comprises a charge pump.

9. The switching voltage regulator of claim 8, wherein the charge pump comprises:
   a first diode having a cathode end and an anode end;
   a second diode having an anode end and a cathode end, wherein the anode end of the first diode is coupled to receive the regulated output voltage, the cathode and of the first diode is coupled to the anode end of the second diode at a junction node, and the boosted output voltage appears and cathode end of the second diode; and a capacitor coupled between the output terminal of the inductor and the junction node.

10. The switching voltage regulator of claim 8, wherein the charge pump comprises:
a first diode having a cathode end and an anode end;
a second diode having an anode end and a cathode end, wherein the anode end of the first diode is coupled to receive the regulated output voltage, the cathode and of the first diode is coupled to the anode end of the second diode at a junction node, and the boosted output voltage appears and cathode end of the second diode;
an oscillator powered from the regulated output voltage and configured to generate an oscillating signal; and
a capacitor having first and second terminals, the first terminal coupled to receive the oscillating signal and the second terminal coupled to the junction node.

11. The switching regulator of claim 1, further comprising:
an input voltage boost circuit coupled to receive the input voltage and configured to generate a boosted input voltage related to and higher than the input voltage; and
a selection circuit coupled to receive the boosted input voltage, coupled to receive the boosted output voltage and configured to select, as a selected boosted voltage, a higher one of the boosted input voltage and the boosted output voltage, wherein the first active electronic component is powered from the selected boosted voltage during the buck, buck-boost, and boost modes of operation.

12. A method in a switching regulator, the switching regulator capable of a buck mode of operation, a boost mode of operation, and a buck-boost mode of operation, the method comprising:
receiving an input voltage;
communicating a first control signal to a first electronic switch;
generating a regulated output voltage in accordance with the communicating;
generating a boosted output voltage related to and higher than the regulated output voltage; and
generating the first control signal with a first active electronic component powered by a voltage approximately equal to the boosted output voltage when the switching regulator is in the boost mode of operation.

13. The method of claim 12, wherein the first electronic switch comprises an n-channel field effect transistor.

14. The method of claim 13, wherein the switching regulator comprises a buck-boost switching regulator operable to generate the regulated output voltage in response to the input voltage being above, below, and equal to the regulated output voltage.

15. The method of claim 14, wherein the generating the boosted output voltage comprises:
generating the boosted output voltage with a charge pump.

16. The method of claim 12, wherein the generating the boosted output voltage comprises:
generating the boosted output voltage with a charge pump.

17. The method of claim 12, further comprising:
generating a boosted input voltage related to and higher than the input voltage; and
selecting, as a selected boosted voltage, a higher one of the boosted input voltage or the boosted output voltage, wherein the first active electronic component is powered from the selected boosted voltage during the buck, buck-boost, and boost modes of operation.

18. The method of claim 17, wherein the generating the boosted output voltage comprises:
generating the boosted output voltage with a charge pump.

19. The method of claim 12, further comprising
communicating a second control signal to a second electronic switch;
generating the second control signal with a second active electronic component powered by a higher one of the regulated output voltage or a fixed regulated voltage.

20. The method of claim 18, wherein the generating the boosted output voltage comprises:
generating the boosted output voltage with a charge pump.

* * * * *

UNITED STATES PATENT AND TRADEMARK OFFICE
CERTIFICATE OF CORRECTION

PATENT NO. : 9,614,428 B2
APPLICATION NO. : 14/683617
DATED : April 4, 2017
INVENTOR(S) : Richard Garvey et al.

It is certified that error appears in the above-identified patent and that said Letters Patent is hereby corrected as shown below:

Column 1, Line 44, delete "of" and replace with --off--.

Column 1, Lines 46 to 47, delete "arrangement. Wherein" and replace with --arrangement, wherein--.

Column 1, Line 58, delete "p-channel. FETs" and replace with --p-channel FETs--.

Column 3, Line 12, delete "and oscillator" and replace with --an oscillator--.

Column 3, Line 18, delete "7," and replace with --7;--.

Column 3, Line 46, delete "be an analog" and replace with --be analog--.

Column 3, Line 56, delete "circuit" and replace with --circuits--.

Column 4, Line 9, delete "and" and replace with --an--.

Column 4, Line 12, delete "as" and replace with --is--.

Column 6, Line 6, delete "e" and replace with --be--.

Column 7, Line 18, delete "(VSEL) voltage 146*a*." and replace with --(VSEL) 146*a*.--.

Column 8, Line 28, delete "134*a*, 134*h*" and replace with --134*a*, 134*b*--.

Column 9, Line 34, delete "(YIN)" and replace with --(VIN)--.

Column 10, Line 40, delete "(YIN") and replace with --(VIN)--.

Column 11, Line 63, delete "Let is" and replace with --Let it--.

Signed and Sealed this
Thirtieth Day of October, 2018

Andrei Iancu
*Director of the United States Patent and Trademark Office*

CERTIFICATE OF CORRECTION (continued)
U.S. Pat. No. 9,614,428 B2

Column 11, Lines 63-64, delete "can operable" and replace with --can be operable--.

Column 11, Line 67, delete "(TOUT)" and replace with --(VOUT)--.

Column 12, Line 6, delete "described U.S." and replace with --described in U.S.--.

Column 12, Line 21, delete "most" and replace with --boost--.

Column 12, Line 45, delete "of" and replace with --of,--.

Column 12, Line 64, delete "wired OR" and replace with --wired-OR--.

Column 14, Line 20, delete "146a)," and replace with --146,--.

Column 14, Line 26, delete "above, described" and replace with --above-described--.

Column 15, Line 50, delete "are which" and replace with --at which--.

Column 15, Line 61, delete "(hut" and replace with --(but--.

Column 16, Line 1, delete "dock" and replace with --clock--.

Column 16, Line 5, delete "of output" and replace with --of the output--.

Column 16, Line 27, delete "buck boost" and replace with --buck-boost--.

Column 16, Line 40, delete "a least" and replace with --at least--.

Column 16, Line 55, delete "of" and replace with --off--.

Column 17, Line 47, delete "(VOUT)123) and replace with --(VOUT)123--.

Column 17, Line 64, delete "FIG. 14 Before" and replace with --FIG. 14. Before--.

Column 17, Line 67, delete "81312." and replace with --1312.--.

Column 19, Line 35, delete "may the" and replace with --may be the--.

Column 19, Line 41, delete "(YIN)" and replace with --(VIN) 104, the--.

Column 20, Line 43, delete "(VIN) 104 the" and replace with --(VIN) 104, the--.

Column 20, Line 46, delete "voltage 1161)" and replace with --voltage 116b--.

Column 21, Line 23, delete "that that" and replace with --that the--.

CERTIFICATE OF CORRECTION (continued)
U.S. Pat. No. 9,614,428 B2

Column 21, Line 66, delete "cathode and" and replace with --cathode end--.

Column 22, Line 2, delete "and" and replace with --at the--.

Column 22, Line 10, delete "and" and replace with --end--.

Column 22, Line 13, delete "and" and replace with --at the--.

Column 22, Lines 40-41, delete "in-channel" and replace with --n-channel--.

Column 22, Line 64, delete "and" and replace with --end--.

Column 22, Line 67, delete "and cathode" and replace with --at the--.

Column 23, Line 8, delete "and" and replace with --end--.

Column 23, Line 11, delete "and cathode" and replace with --at the--.